(12) United States Patent
Matsushita et al.

(10) Patent No.: US 9,916,521 B2
(45) Date of Patent: Mar. 13, 2018

(54) DEPTH NORMALIZATION TRANSFORMATION OF PIXELS

(71) Applicant: CANON KABUSHIKI KAISHA, Tokyo (JP)

(72) Inventors: Masahiro Matsushita, Yokohama (JP); Hirotaka Shiiyama, Yokohama (JP); Hideki Sorakado, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 40 days.

(21) Appl. No.: 15/075,736

(22) Filed: Mar. 21, 2016

(65) Prior Publication Data

US 2016/0284092 A1 Sep. 29, 2016

(30) Foreign Application Priority Data

Mar. 23, 2015 (JP) .................. 2015-060016

(51) Int. Cl.
*G06K 9/62* (2006.01)
*G06K 9/00* (2006.01)
*G06K 9/36* (2006.01)
*G06T 3/00* (2006.01)
*G06T 7/50* (2017.01)

(52) U.S. Cl.
CPC ....... *G06K 9/6215* (2013.01); *G06K 9/00201* (2013.01); *G06K 2009/363* (2013.01); *G06K 2209/01* (2013.01); *G06T 3/0093* (2013.01); *G06T 7/50* (2017.01)

(58) Field of Classification Search
CPC ............. H04N 13/0022; H04N 19/126; H04N 2013/0081; G06T 3/0093; G06T 15/20; G06T 2207/10028; G06T 7/50; G06K 2009/363; G06K 9/6215; G06K 9/00201; G06K 2209/01
See application file for complete search history.

(56) References Cited

U.S. PATENT DOCUMENTS 9,076,064 B2   7/2015  Shiiyama et al.
2010/0026897 A1* 2/2010  Sharlet .................. G06T 7/238
                                              348/607

(Continued)

FOREIGN PATENT DOCUMENTS

JP   2000-057377 A   2/2000

OTHER PUBLICATIONS

Harris, C. et al.,"A Combined Corner and Edge Detector," Alvey Vision Conference, Plessey Research Roke Manor, UK, 1988, pp. 147-152.

(Continued)

*Primary Examiner* — Kenny Cese
(74) *Attorney, Agent, or Firm* — Carter, DeLuca, Farrell & Schmidt, LLP

(57) ABSTRACT

A feature point is extracted from an input image including an image region for which depth values of pixels change consecutively. A transformation that normalizes depth values of pixels of a vicinity of the feature point with respect to a region of at least a portion of the input image is set as a normalization transformation, and an image for a feature amount calculation is generated by performing the normalization transformation on a pixel position of the feature point. A feature amount is calculated from the image for the feature amount calculation.

9 Claims, 16 Drawing Sheets

(56) References Cited

U.S. PATENT DOCUMENTS

| | | | | |
|---|---|---|---|---|
| 2010/0091093 A1* | 4/2010 | Robinson | ............... | G09G 3/003 348/47 |
| 2013/0011046 A1* | 1/2013 | Choi | ..................... | G06T 3/4007 382/154 |
| 2014/0293043 A1* | 10/2014 | Datta | ....................... | G01C 5/00 348/135 |
| 2015/0009207 A1* | 1/2015 | Guo | ........................ | G06T 15/00 345/419 |
| 2015/0294187 A1 | 10/2015 | Sorakado et al. | | |
| 2015/0379368 A1 | 12/2015 | Shiiyama et al. | | |

OTHER PUBLICATIONS

Lowe, David G., "Distinctive Image Features from Scale-Invariant Keypoints," International Journal of Computer Vision, 60, 2 (2004), pp. 91-110.

Koenderink, J.J. et al., "Representation of Local Geometry in the Visual System," Biological Cybernetics, vol. 55, 1987, pp. 367-375.

* cited by examiner

IMAGE IN WHICH FRONT SURFACE IS CAPTURED

101

PARTIALLY ENLARGED DISPLAY →

103

IMAGE CAPTURED AFTER ROTATING OBJECT 60 DEGREES

102

PARTIALLY ENLARGED DISPLAY ⇢

104

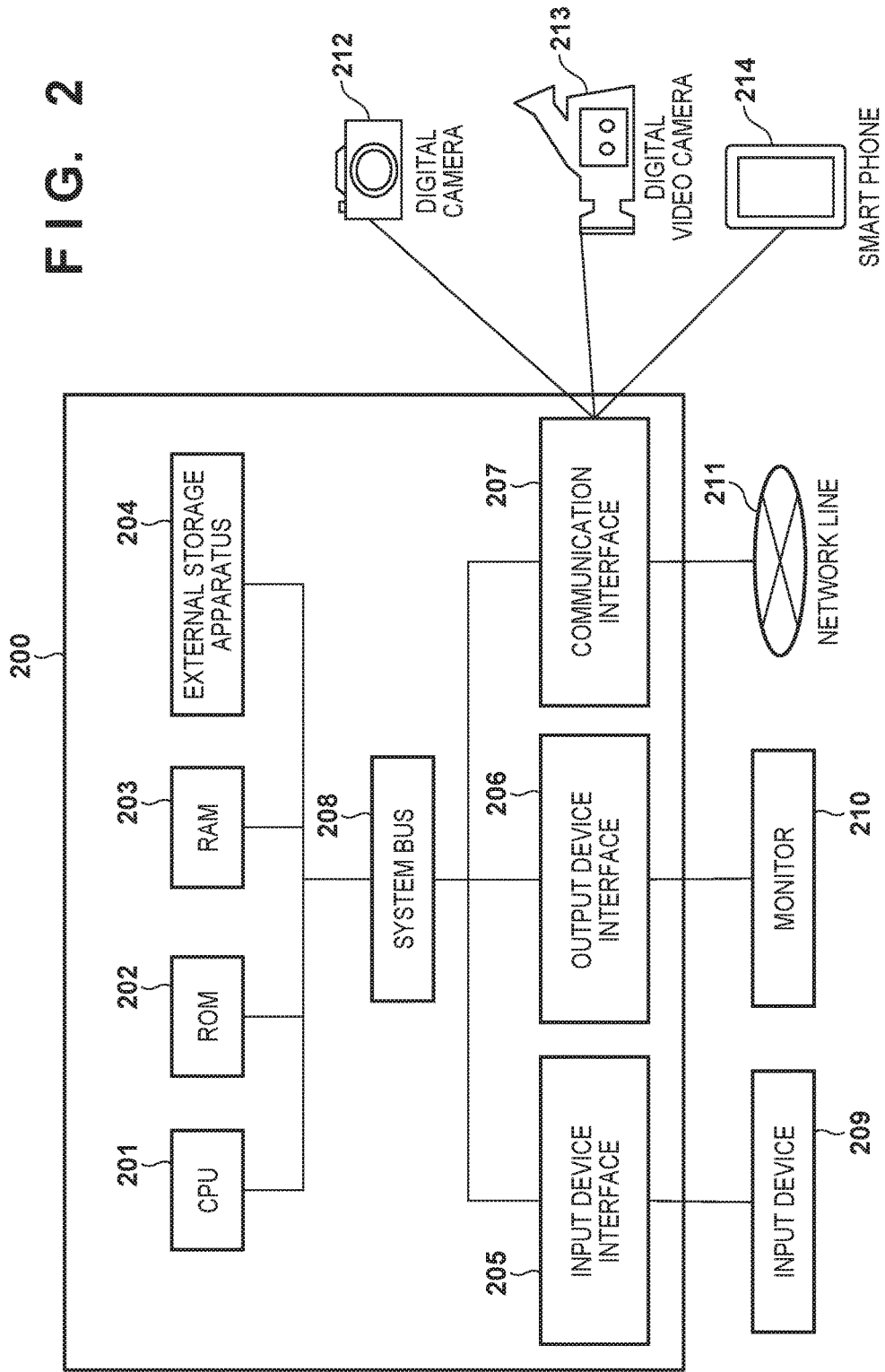

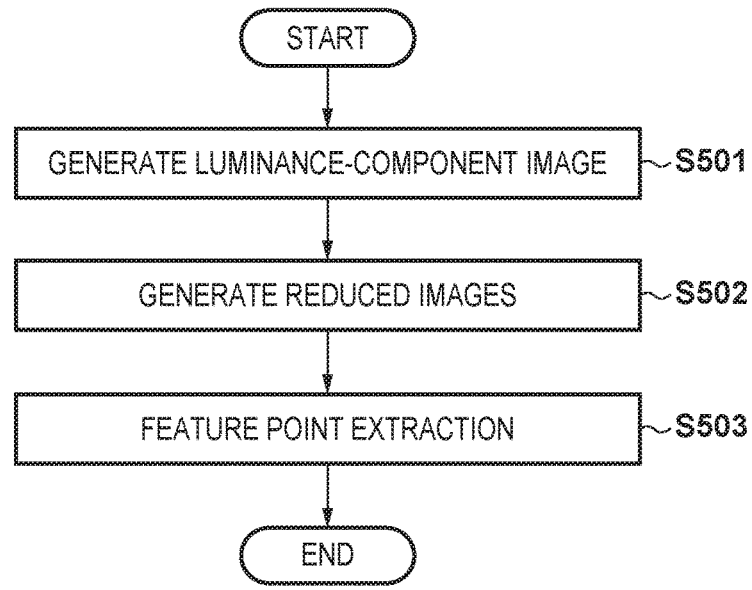
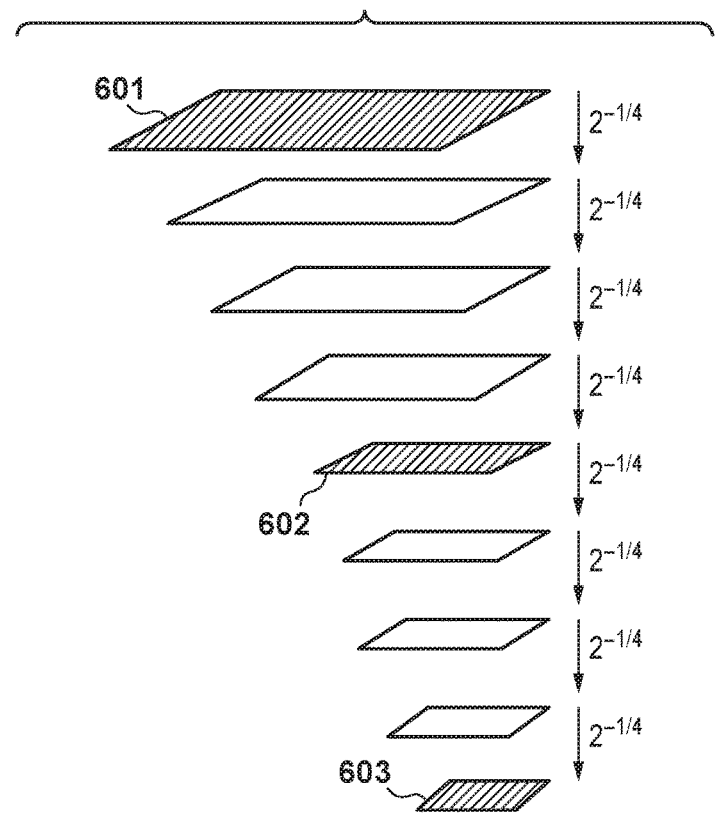

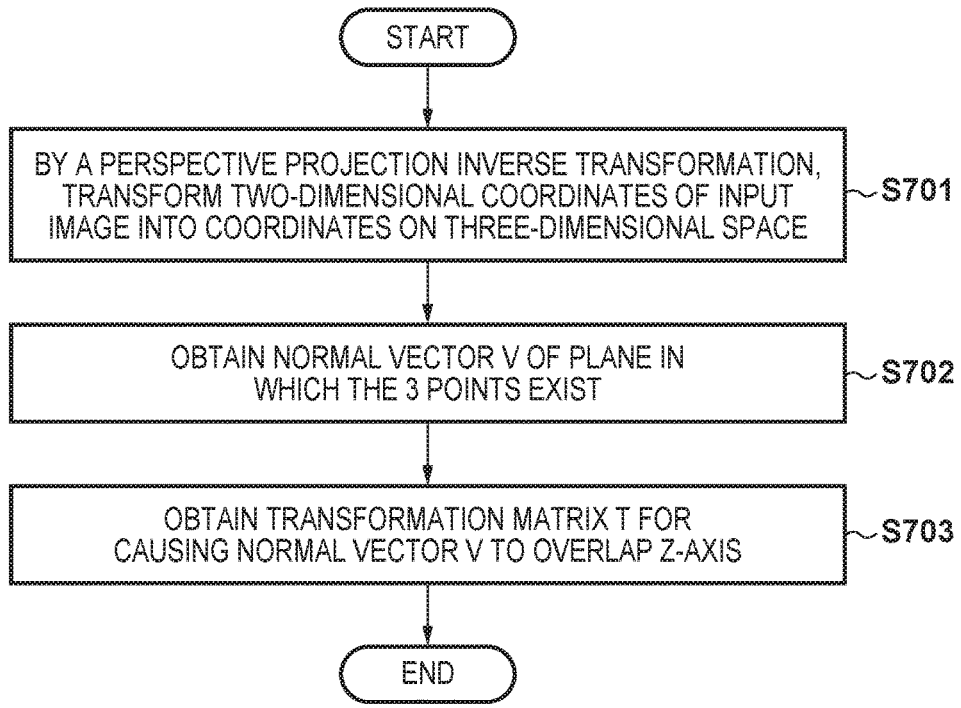
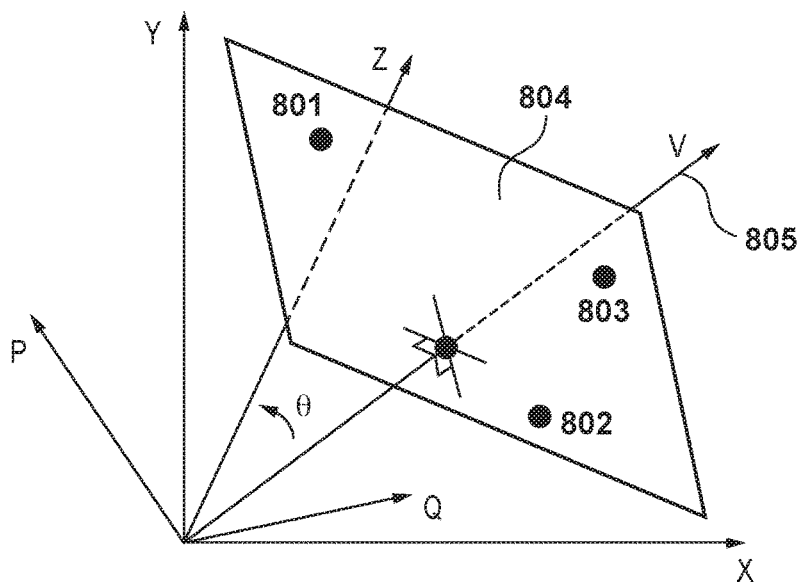

IMAGE IN WHICH FRONT SURFACE IS CAPTURED

901

FEATURE AMOUNT CALCULATION REGION

903

IMAGE CAPTURED AFTER ROTATING OBJECT 60 DEGREES

902

IMAGE TRANSFORMATION

904

IMAGE IN WHICH FRONT
SURFACE IS CAPTURED

1201

IMAGE CAPTURED AFTER
ROTATING OBJECT 60 DEGREES

1202

FEATURE
AMOUNT
CALCULATION
REGION
→

1203

FEATURE
AMOUNT
CALCULATION
REGION
→

1204

F I G. 16A
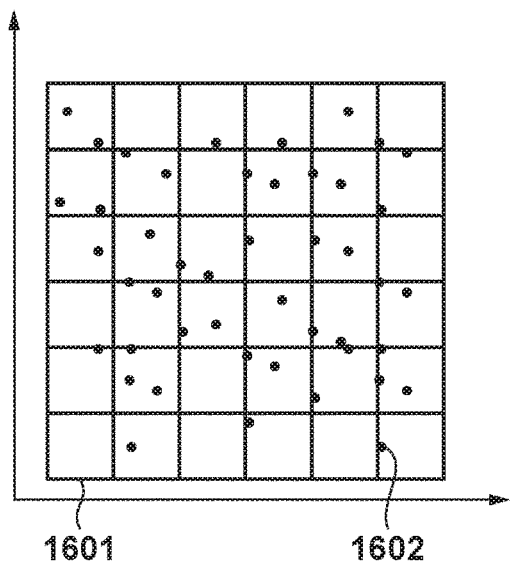
1601    1602
F I G. 16B
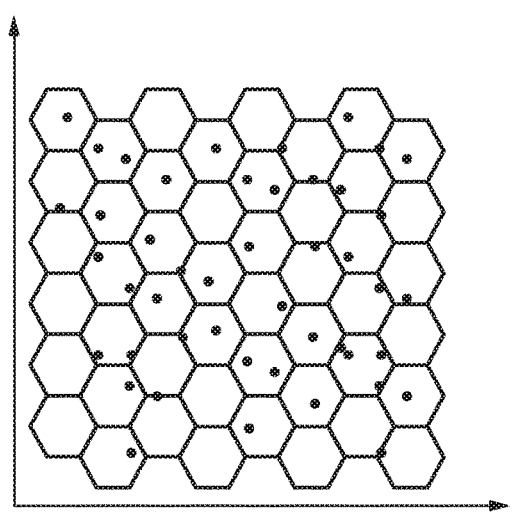

| FEATURE AMOUNT ID | IMAGE ID |
|---|---|
| 1 | 256 |
| 3 | 128 |
| ... | |
| 12 | 1000 |
| ... | |
| 345 | 1000 |
| 345 | 382 |
| ... | |
| 6789 | 1000 |
| ... | |

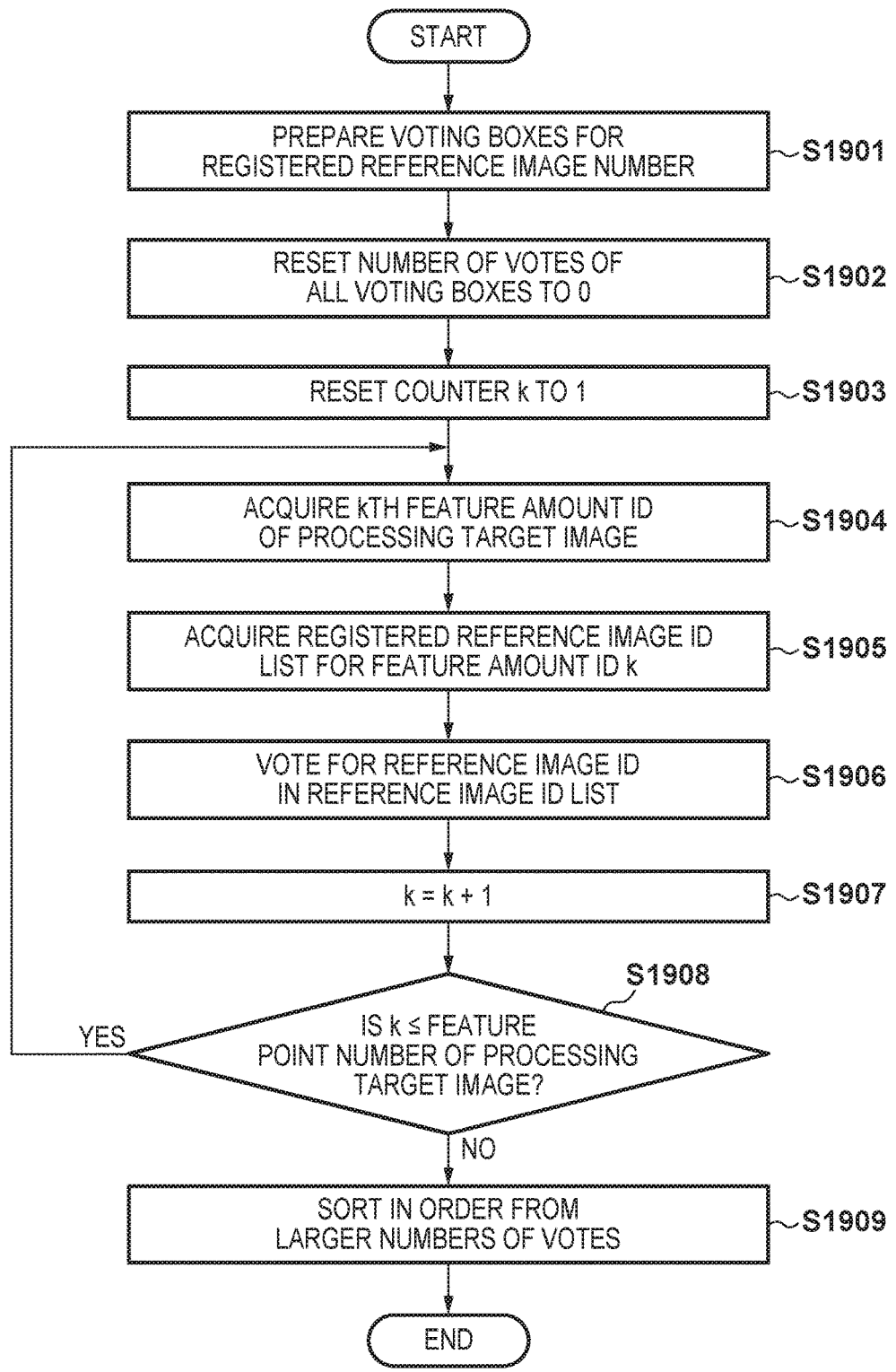

DEPTH NORMALIZATION TRANSFORMATION OF PIXELS

BACKGROUND OF THE INVENTION

Field of the Invention

The present invention relates to a technique for calculating feature amounts from an image.

Description of the Related Art

A method for searching for a similar image using local feature amounts (local feature amount) of an image has been proposed. In this method, first, a characteristic point (a local feature point) is extracted from an image (for example, refer to C. Harris and M. J. Stephens, "A combined corner and edge detector," In Alvey Vision Conference, pages 147-152, 1988). Next, based on that local feature point and image information of a periphery thereof, a feature amount (a local feature amount) corresponding to that local feature point is calculated (for example, refer to David G. Lowe, "Distinctive Image Features from Scale-Invariant Keypoints," International Journal of Computer Vision, 60, 2 (2004), pp. 91-110).

In a method using local feature amounts, a local feature amount is defined as information comprised by a plurality of elements that are rotationally invariant and magnification/reduction invariant in a plane. With this, a search is made to be possible even in a case where an image is rotated, magnified or reduced in a plane. Generally, a local feature amount is represented as a vector.

In David G. Lowe, "Distinctive Image Features from Scale-Invariant Keypoints," International Journal of Computer Vision, 60, 2 (2004), pp. 91-110, for example, to extract a local feature amount that is rotationally invariant in a plane, a main direction is calculated from a pixel pattern of a local region of a local feature point periphery, and a direction normalization is performed by rotating the local region in the plane based on the main direction when calculating the local feature amount. Also, in order to calculate a magnification/reduction invariant local feature amount, an image of a different scale is generated internally, and from each image scale, local feature point extraction and local feature amount calculation are performed. Here, an image collection of a sequence of differing scales generated internally is generally called a scale space.

By the foregoing method, a plurality of local feature points are extracted from one image. In an image search using local feature amounts, matching is performed by performing a comparison of local feature amounts calculated from respective local feature points with each other. In a voting method (for example, refer to Japanese Patent Laid-Open No. 2000-57377), which is often used, if there exists in a registered image (hereinafter referred to as a comparison target image) a feature point having a feature amount similar to the local feature amount of a feature point that is extracted from a comparison source image, a vote is made for the comparison target registered image. Configuration is such that the greater the number of votes for a registered image, the more similar it is to the comparison source image.

There was a problem in that upon performance of a search of an image subjected to an out-of-plane rotation using local feature amounts as recited in David G. Lowe, "Distinctive Image Features from Scale-Invariant Keypoints," International Journal of Computer Vision, 60, 2 (2004), pp. 91-110, while a search of an image subjected to an out-of-plane rotation of up to 30 degrees is possible, the search accuracy for an image subjected to an out-of-plane rotation greater than that would become low.

FIGS. 1A-1D are views for explaining an example of a pixel range used for calculating a local feature amount. An explanation is given for the cause of lower search accuracy of an image which is subjected to an out-of-plane rotation using FIGS. 1A-1D. FIG. 1A is a schematic diagram of the image captured from a front surface of an object, and FIG. 1B is a schematic diagram of the image captured from the same location after causing the object to rotate 60 degrees counterclockwise from the state of FIG. 1A. Here, reference numeral 101, whose center point is one of local feature points extracted from the image of FIG. 1A, illustrates an example of a pixel range used for calculating a local feature amount from the local feature point. Similarly, reference numeral 102, whose center point is one of local feature points extracted from the image of FIG. 1B, is illustrating an example of a pixel range used for calculating a local feature amount from the local feature point. Also, FIG. 1C is a figure magnifying a periphery of the pixel range 101 in FIG. 1A and FIG. 1D is a figure magnifying a periphery of the pixel range 102 in FIG. 1B.

Here, 103 and 104 are local feature amount calculation regions whose center is a local feature point extracted from a bottom-left corner of a character "B". The left side of the local feature amount calculation region 103 is slightly overlapping the character "A" and the right side is substantially in the middle of the character "B". On the other hand, the left side of the local feature amount calculation region 104 is overlapping more than the half of the character "A" and the right side is the same as the right side of "B". In spite of the fact that the local feature points are extracted from almost the same location in the local feature amount calculation region 103 and the local feature amount calculation region 104, it can be seen that the pixels used for calculating the local feature amounts are significantly different. With this, the local feature amount changes and the precision of an image search is degraded. In this way, it was conventionally difficult to search an image subjected to an out-of-plane rotation with a high precision with local feature amounts that are rotationally invariant in a plane.

SUMMARY OF THE INVENTION

The present invention was conceived in view of these kinds of problems, and provides a technique for calculating a local feature amount that tends not to be influenced by an out-of-plane rotation. The present invention further provides a technique by which it is possible to match and search between images subjected to an out-of-plane rotation.

According to the first aspect of the present invention, there is provided an image processing apparatus, comprising: an extraction unit configured to extract a feature point from an input image including an image region in which depth values of pixels change consecutively; a generation unit configured to, a normalization transformation being a transformation that normalizes depth values of pixels of a vicinity of the feature point with respect to a region of at least a portion of the input image, generate an image for a feature amount calculation by performing the normalization transformation on a pixel position of the feature point; and a calculation unit configured to calculate a feature amount from the image for the feature amount calculation generated by the generation unit.

According to the second aspect of the present invention, there is provided an image processing method that an image processing apparatus performs, the method comprising: extracting a feature point from an input image including an image region in which depth values of pixels change consecutively; a normalization transformation being a transformation that normalizes depth values of pixels of a vicinity of the feature point with respect to a region of at least a portion of the input image, generating an image for a feature amount calculation by performing the normalization transformation on a pixel position of the feature point; and calculating a feature amount from the generated image for the feature amount calculation.

According to the third aspect of the present invention, there is provided a non-transitory computer-readable storage medium storing a computer program for causing a computer to function as an extraction unit configured to extract a feature point from an input image including an image region in which depth values of pixels change consecutively; a generation unit configured to, a normalization transformation being a transformation that normalizes depth values of pixels of a vicinity of the feature point with respect to a region of at least a portion of the input image, generate an image for a feature amount calculation by performing the normalization transformation on a pixel position of the feature point; and a calculation unit configured to calculate a feature amount from the image for the feature amount calculation generated by the generation unit.

Further features of the present invention will become apparent from the following description of exemplary embodiments (with reference to the attached drawings).

BRIEF DESCRIPTION OF THE DRAWINGS

FIG. 2 is a block diagram for showing an example of a hardware configuration of a computer apparatus.

FIG. 5 is a flowchart for showing detail of the process in step S402.

FIG. 6 is a view for showing a concrete example of a process in step S502.

FIG. 7 is a flowchart for showing detail of the process in step S408.

FIG. 8 is a view for explaining a process in step S702.

FIGS. 16A and 16B are views for explaining quantization in step S1504.

FIG. 19 is a flowchart for showing detail of the process in step S1805.

DESCRIPTION OF THE EMBODIMENTS

Embodiments of the present invention will be described hereinafter in detail, with reference to the accompanying drawings. Note that embodiments described below merely illustrate examples of specifically implementing the present invention, and are only specific embodiments of a configuration defined in the scope of the claims.

[First Embodiment]

In the present embodiment, explanation is given of an example of an image processing apparatus that extracts a feature point from an input image including an image region for which depth values of pixels change consecutively; a normalization transformation being a transformation that normalizes depth values of pixels of a vicinity of the feature point with respect to a region of at least a portion of the input image, generates an image for a feature amount calculation by performing that normalization transformation on a pixel position of the feature point; and calculates a feature amount from this generated image for the feature amount calculation. Such an image processing apparatus is effective in a case when calculating a local feature amount for a local feature point extracted from a plane of a physical object, for example.

Note that, this "image region for which depth values of pixels change consecutively" may be a portion, or may be the entirety of an input image. For example, if this kind of image region is included in a particular image, a partial image extracted from the image region may be made to be the foregoing input image.

Figure 1A:
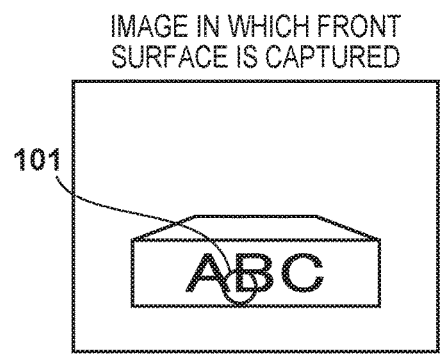
FIGS. 1A-1D are views for explaining examples of pixel ranges used to calculate a local feature amount.
Figure 1C:
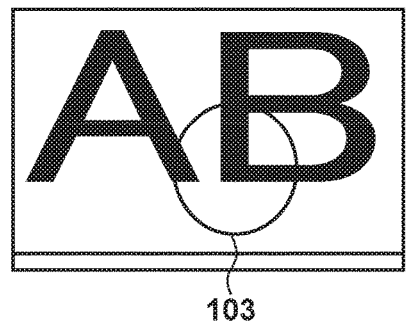
Figure 1B:
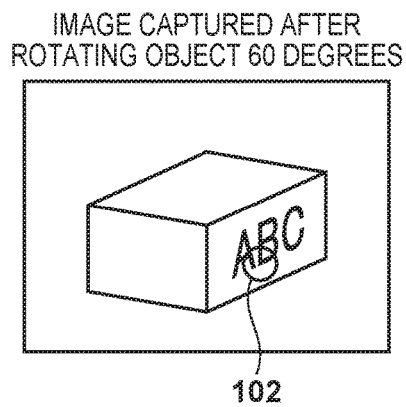
Figure 1D:
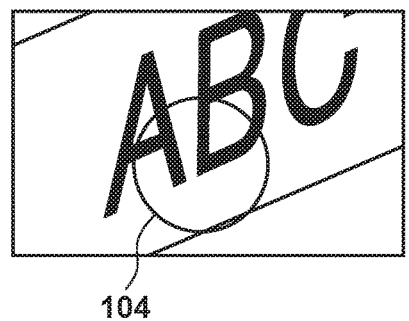
Figure 3:
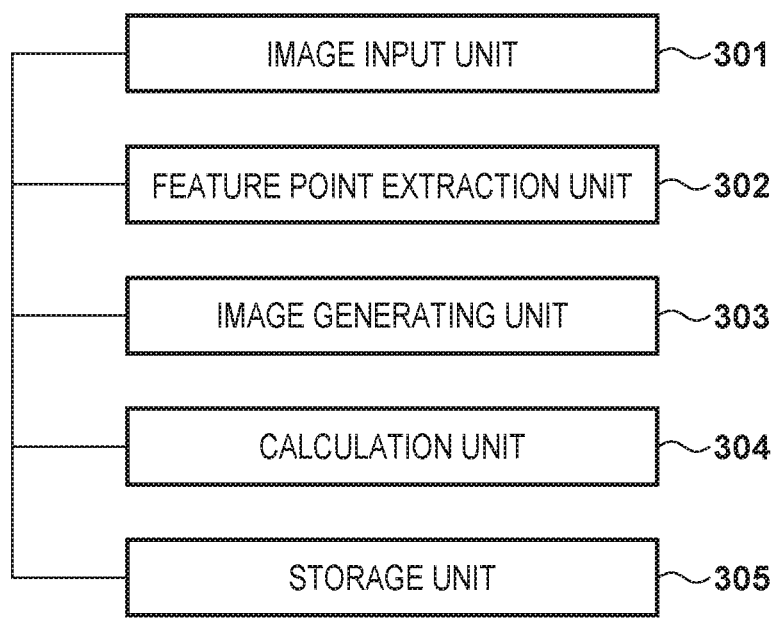
FIG. 3 is a block diagram for illustrating an example of a functional configuration of an image processing apparatus.

Firstly, explanation is given for an example of a functional configuration of the image processing apparatus according to the present embodiment using the block diagram of FIG. 3.

An image input unit 301 inputs a source image. Note that explanation is given having information representing depth values of each pixel configuring a source image included in the source image.

A feature point extraction unit 302, in addition to generating a luminance-component image representing the luminance component of the source image that the image input unit 301 inputted, generates a plurality of reduced images by recursively reducing the luminance-component image a plurality of times, and extracts a local feature point from the luminance-component image and the plurality of reduced images respectively.

An image generating unit 303 generates, for each of the local feature points that the feature point extraction unit 302 extracts, "an image according to a pixel group for which depth values are normalized" that corresponds to an image region included in the local feature point.

A calculation unit 304 calculates a feature amount from the images generated by the image generating unit 303, and outputs the calculated feature amount. The output destination of the feature amount is not limited to a particular output destination; output may be to a storage unit 305, output may be to an external memory, and output may be to an external device that performs processing using that feature amount.

The storage unit 305 is a memory that is used for the respective operations of the image input unit 301, the feature point extraction unit 302, the image generating unit 303, and the calculation unit 304, and, for example, the calculation unit 304 stores a calculated feature amount in the storage unit 305.

Figure 4:
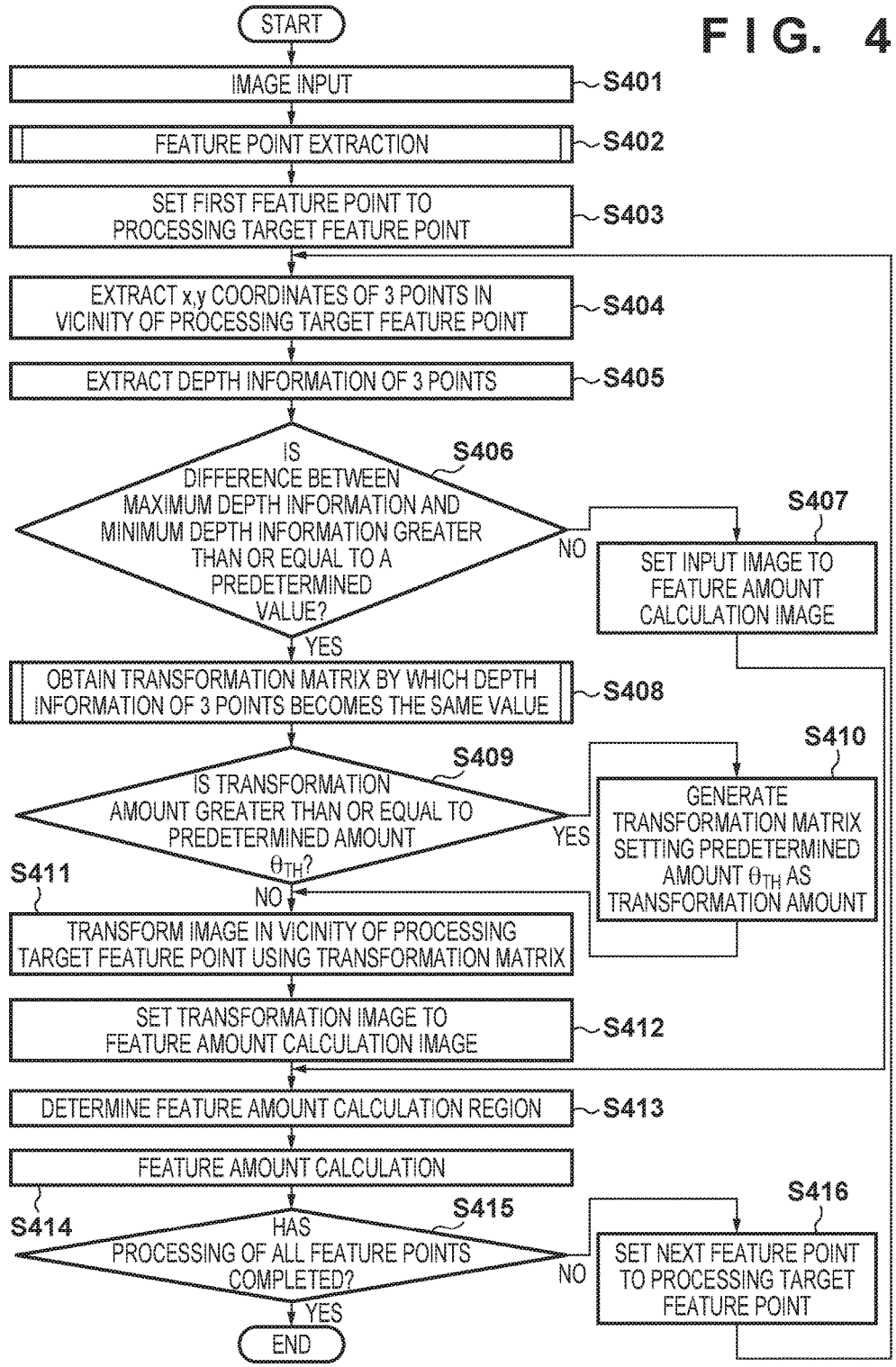
FIG. 4 is a flowchart of a process performed for calculating a feature amount from an image.

Next, explanation is given for a process that the image processing apparatus according to the present embodiment performs to calculate a feature amount from the image using FIG. 4 which illustrates a flowchart of the same process.

<Step S401>

The image input unit 301 stores a source image that is input from an external unit to the storage unit 305. Note that the acquisition source for the source image is not limited to an external unit, and, for example, configuration may be such that the source image is acquired from an internal memory (not shown) that the image processing apparatus comprises.

<Step S402>

The feature point extraction unit 302 reads out the source image stored in the storage unit 305 in step S401, and extracts a local feature point based on that read out source image. For details of the process in step S402, explanation is given using FIG. 5 which illustrates a flowchart of the same process.

<Step S501>

The feature point extraction unit 302 reads out the source image stored in the storage unit 305, and generates a luminance-component image that represents a luminance component of each pixel that configures the source image. In other words, the luminance component (a pixel value) at a pixel position (x, y) on the luminance-component image is a luminance component (a luminance value) of a pixel at the pixel position (x, y) on the source image.

<Step S502>

The feature point extraction unit 302 generates a plurality of reduced images for the luminance-component image by recursively reducing the luminance-component image generated in step S501, in accordance with a reduction factor p (0<p<1) which is set in advance, repeating a predetermined number of times. By the processing up until this point, n images, including the original image (n is an integer greater than or equal to 2), that are reduced in a stepwise fashion from the original size image (the luminance-component image) are generated.

A concrete example of a process in step S502 is illustrated in FIG. 6. In FIG. 6, a magnification factor p is "2 to the power of –(¼)", and the number of images n is "9". Of course, the magnification factor p need not necessarily be "2 to the power of –(¼)". In FIG. 6, reference numeral 601 is the luminance-component image generated in step S501. Reference numeral 602 is a reduced image obtained by recursively performing a reducing process 4 times from the luminance-component image 601 in accordance with the magnification factor p. Reference numeral 603 is a reduced image reduced 8 times from the luminance-component image 601 in accordance with the magnification factor p.

In this example, the reduced image 602 is an image for which the vertical/horizontal sizes of the luminance-component image 601 are reduced to ½, and the reduced image 603 is an image for which the vertical/horizontal sizes of the luminance-component image 601 are reduced to ¼. Note that the method of reducing the image in the present embodiment is assumed to be something that generates a reduced image by a method of reducing in accordance with a linear interpolation. However, the method of generating the reduced images is not limited to a particular method and any method may be employed.

<Step S503>

The feature point extraction unit 302, with the luminance-component image and the plurality of reduced images as input images respectively, extracts, from the input image, a feature point that is local (local feature point) that can be robustly extracted even when the image is rotated. As such a method for extracting a local feature point, a Harris operator is employed in the present embodiment (refer to C. Harris and M. J. Stephens, "A combined corner and edge detector," In Alvey Vision Conference, pages 147-152, 1988).

Specifically, for a pixel on an output image H obtained using a Harris operator, pixel values of that pixel and the 8 pixels neighboring that pixel (a total of 9 pixels) are examined. Then, a point is extracted as the local feature point so that pixel becomes a local maximum (so that the pixel value of that pixel becomes the maximum in those 9 pixels). Here, configuration is such that even when that pixel becomes a local maximum, it is not extracted as a local feature point if the value of that pixel is less than or equal to a threshold value.

Note that any feature point extraction method can be applied if it is a method by which a local feature point can be extracted, and limitation is not made to the feature point extraction method by the Harris operator as described above.

<Step S403>

Because a local feature point group extracted from the luminance-component image and the plurality of reduced images at the point in time at which the processing of step S402 completes is obtained, the image generating unit 303 selects an unselected one from the local feature point group as a processing target feature point. Also, below, the image of the extraction source from which the processing target feature point is extracted is referred as the target image. For example, in a case where the processing target feature point is something that is extracted from the luminance-component image, the target image is the luminance-component image, and in a case where the processing target feature point is extracted from one among the plurality of reduced images, the target image is that one reduced image.

<Step S404>

The image generating unit 303 determines three points that do not line up on a straight line in the vicinity of the processing target feature point, and acquires the respective image coordinates of the determined three points. The image coordinates are coordinates in a coordinate system defined by setting a position of an upper-left corner of the target image as the origin, x-coordinates in a horizontal orientation, and y-coordinates in a vertical orientation, for example, and coordinates on the target image for each pixel are represented by these image coordinates.

Here, "the vicinity of the processing target feature point" is a region for which the processing target feature point is made to be the center, and is a region whose size is a size that is set in advance based on the size of a later described feature amount calculation region, or a fixed size that is predetermined.

Also, the three points determined here may include the local feature point, but they may be any points if they are "three points that do not line up on a straight line in the vicinity of the processing target feature point". That is, in other words, the "three points that do not line up on a straight line in the vicinity of the processing target feature point" are three points that can be the vertexes of a triangle. If the form achieved by connecting the three points determined in step S404 forms a triangle and not a straight line, later processing is mathematically possible, but in order to lighten the influence of error, it is desirable to select three points that are somewhat separated from each other. Also, configuration may be taken such that first a number of points that is more than three points is extracted, and then the three points are selected from out of those points in accordance with some kind of criteria. For example, there is a method that selects three points for which depth values are relatively separated from each other. Also, configuration may be taken such that the processing target feature point itself is included in the three points.

Below, the image coordinates of the three points determined in step S404 are described as $(x_1, y_1)$, $(x_2, y_2)$ and $(x_3, y_3)$ respectively. Note that there are cases in which the image coordinates of the three points are collectively described as $(x_n, y_n)$ (n =1, 2, 3).

<Step S405>

The image generating unit 303 acquires a depth value at the pixels of the three points determined in step S404. Hereinafter, the depth value of the pixel at the image coordinates $(x_1, y_1)$, the depth value of the pixel at the image coordinates $(x_2, y_2)$, and the depth value of the pixel at the image coordinates $(x_3, y_3)$ are described as $z_1$, $z_2$, and $z_3$ respectively.

<Step S406>

The image generating unit 303 identifies a maximum depth value $z_{max}$ among z1 through z3 and a minimum depth value $z_{min}$, and calculates $\Delta z = z_{max} - z_{min}$. Also, the image generating unit 303 determines whether or not $\Delta z$ is greater than or equal a predetermined value. If the result of this determination is that $\Delta z$ is greater than or equal to the predetermined value, the processing proceeds to step S408, and if $\Delta z$ is smaller than the predetermined value, the processing proceeds to step S407.

Note that the criteria for the determination in step S406 is not limited to a magnitude relationship between Δz and a predetermined value, and configuration may be taken such that a determination is made using statistical information such as a standard deviation or a distribution of the depth values of the three points. In such a case, configuration may be taken so as to make the determination using the depth values of more points than the three points, rather than using the depth values of the three points, and to select the three points thereafter.

<Step S407>

The processing proceeding to step S407 means that the difference in the depth values of the pixels at the three points determined in step S404 is small, and in such a case, a region of a periphery of the processing target feature point (a later explained feature amount calculation region) is a region for which it is possible to calculate a local feature amount that tends not to be influenced by an out-of-plane rotation. In such a case, it is not necessary to generate "an image according to a pixel group for which the depth values are normalized" as is explained below. Accordingly, the image generating unit 303 sets the target image as the feature amount calculation image.

<Step S408>

The image generating unit 303 obtains a transformation matrix T for setting $z_1$ through $z_3$ to be the same value (normalization). For details of the process in step S408, explanation is given using a flowchart of FIG. 7.

<Step S701>

The image generating unit 303, by a perspective projection inverse transformation, transforms into coordinates of three points on a physical space corresponding to the foregoing three points in the target image (transforms two-dimensional coordinates on the target image into three-dimensional coordinates). The target image is something achieved by projecting an object in three-dimensional space onto a projection plane. If the distance from a viewpoint (for example, a viewpoint position of a captured image that captures an image) to the projection plane is assumed to be d, the coordinates $(x_{rn}, y_{rn}, z_{rn})$ (n=1, 2, 3) of the three points on the physical space corresponding to the foregoing three points on the target image can be obtained in accordance with the following Equations (1) through (3).

$$x_m = \frac{x_n \cdot z_n}{d} \quad (1)$$

$$y_m = \frac{y_n \cdot z_n}{d} \quad (2)$$

$$z_m = z_n \quad (3)$$

<Step S702>

The image generating unit 303 obtains a normal vector V of a plane including the three points in the physical space corresponding to the foregoing three points in the target image. FIG. 8 is a view for illustrating an example of three points (801, 802, 803) in the physical space corresponding to the foregoing three points in the target image, a plane 804 including the three points (801, 802, 803), and a normal vector V 805 of the plane 804.

If it is assumed that a normal vector $V = (v_x, v_y, v_z)$, $v_x$, $v_y$, and $v_z$ can respectively be obtained using the three-dimensional coordinates $(x_{r1}, Y_{r1}, Z_{r1})$, $(x_{r2}, y_{r2}, z_{r2})$ and $(x_{r3}, y_{r3}, z_{r3})$ of the three points (801, 802, 803) in accordance with the following Equation (4) through (6).

$$v_x = (y_{r2} - y_{r1})(z_{r3} - z_{r1}) - (y_{r3} - y_{r1})(z_{r2} - z_{r1}) \quad (4)$$

$$v_y = (z_{r2} - z_{r1})(x_{r3} - x_{r1}) - (z_{r3} - z_{r1})(x_{r2} - x_{r1}) \quad (5)$$

$$v_z = (x_{r2} - x_{r1})(y_{r3} - y_{r1}) - (x_{r3} - x_{r1})(y_{r2} - y_{r1}) \quad (6)$$

<Step S703>

The image generating unit 303 obtains a transformation matrix T for causing the normal vector V to overlap a Z-axis (an axis defined in the depth direction from the projection plane; depth values are values on the Z-axis). If the vector V is transformed so as to overlap the Z-axis, a plane including the three points in the physical space corresponding to the foregoing three points in the target image is transformed into a state in which it is parallel to the projection plane (the target image), and as a result, the z coordinate values of the foregoing three points on the transformed plane are all of the same value (the distance from the projection plane to the transformed plane). In the case of FIG. 8, if the vector V is transformed so as to overlap the Z-axis, the plane 804 is transformed into a state in which it is parallel with the XY plane (the projection plane). In step S703, the transformation matrix T that realizes such a transformation, that is a transformation that normalizes the depth values of the foregoing three points, is obtained. Below, explanation is given for a specific process for obtaining the transformation matrix T.

Here, by causing a rotation of θ setting a normal vector P between the normal vector V and a vector in a Z-axis direction as a rotation axis, the normal vector V and the Z-axis are overlapped. Here, θ is called the transformation amount upon coordinate transformation.

First, by Equation (7) through (9) below, a unit vector V1 ($v_{1x}$, $v_{1y}$, $v_{1z}$) of the normal vector V is obtained.

$$v1_x = \frac{v_x}{|V|} \quad (7)$$

$$v1_y = \frac{v_y}{|V|} \quad (8)$$

$$v1_z = \frac{v_z}{|V|} \quad (9)$$

Next, the normal vector P ($p_x$, $p_y$, $p_z$) between the unit vector V1 and a unit vector Z1 (0, 0, 1) in a Z-axis direction is obtained. Because a normal vector between vectors is represented by an outer product of the vectors, it is obtained by Equation (10) through (12) below.

$$p_x = v1_y \quad (10)$$

$$p_y = v1_x \quad (11)$$

$$p_z = 0 \quad (12)$$

Furthermore, by Equation (13) through (15) below, a unit vector P1 ($p_{1x}$, $P_{1y}$, $P_{1z}$) of the normal vector P is obtained.

$$p1_x = \frac{p_x}{|P|} \quad (13)$$

$$p1_y = \frac{p_y}{|P|} \quad (14)$$

$$p1_z = \frac{p_z}{|P|} \quad (15)$$

Next, by Equation (16) through (18) below, a normal vector Q ($q_x$, $q_y$, $q_z$) between the unit vector P1 and the unit vector Z1 in the Z-axis direction are obtained.

$$q_x = p1_y \quad (16)$$

$$q_y = p1_x \quad (17)$$

$$q_z = 0 \quad (18)$$

Furthermore, by Equation (19) through (21) below, a unit vector Q1 ($q_{1x}$, $q_{1y}$, $q_{1z}$) of the normal vector Q is obtained.

$$q1_x = \frac{q_x}{|Q|} \quad (19)$$

$$q1_y = \frac{q_y}{|Q|} \quad (20)$$

$$q1_z = \frac{q_z}{|Q|} \quad (21)$$

Here, orthonormal coordinates for which the unit vectors Q1, P1 and Z1 are base vectors are defined. By rotating in this coordinate space by θ with the unit vector P1 as the rotation axis, the normal vector V is caused to match the Z-axis. A transformation matrix R at that time is represented by Equation (22) below.

$$R = \begin{pmatrix} \cos\theta & 0 & \sin\theta \\ 0 & 1 & 0 \\ -\sin\theta & 0 & \cos\theta \end{pmatrix} \quad (22)$$

where $\sin\theta = |P|$ $\cos\theta = V1 \cdot Z1 = v1_z$

Also, if S is a matrix for transforming a coordinate system of orthonormal coordinates for which the unit vectors Q1, P1 and Z1 are base vectors to an XYZ coordinate system, and $S^{-1}$ is the inverse matrix thereof, these matrices are represented by Equation (23) and (24) below.

$$S = \begin{pmatrix} q1_x & p1_x & z1_x \\ q1_y & p1_y & z1_y \\ q1_z & p1_z & z1_z \end{pmatrix} \quad (23)$$

$$S^{-1} = \begin{pmatrix} q1_x & q1_y & q1_z \\ p1_x & p1_y & p1_z \\ z1_x & z1_y & z1_z \end{pmatrix} \quad (24)$$

Here, the transformation matrix T can be represented as in Equation (25) below using the matrices S, $S^{-1}$ and R. Also, if the transformation matrix T is used, as illustrated in Equation (26), it is possible to transform the coordinates ($x_m$, $y_m$, $z_m$) into the coordinates ($x_{tm}$, $y_{tm}$, $z_{tm}$). The coordinates ($x_{tm}$, $Y_{tm}$, $z_{tm}$) are coordinates of the foregoing three points on the transformed plane.

$$T = SRS^{-1} \quad (25)$$

$$\begin{pmatrix} x_{tm} \\ y_{tm} \\ z_{tm} \end{pmatrix} = T \begin{pmatrix} x_m \\ y_m \\ z_m \end{pmatrix} \quad (26)$$

<Step S409>

Also, the image generating unit 303 determines whether or not the transformation amount θ is greater than or equal a predetermined amount $θ_{TH}$. If the result of this determination is that the transformation amount θ is greater than or equal to the predetermined amount $θ_{TH}$, the processing proceeds to step S410, and if the transformation amount θ is smaller than the predetermined amount $θ_{TH}$ the processing proceeds to step S411.

<Step S410>

The image generating unit 303 once again calculates the foregoing transformation matrix T, but at that time it recalculates the transformation matrix T setting the foregoing θ as the predetermined amount $θ_{TH}$. The transformation amount θ is the amount to rotate such that a portion having a slope in the depth direction faces the front, and in a case where the rotation amount is large, a pixel interpolation amount becomes large and the image quality decreases. Accordingly, by step S409 and step S410, a restriction is arranged such that the pixel interpolation amount does not become too large. However, the processing of step S410 may be omitted, and in such a case, configuration may be taken to omit the processing of step S409, and for the processing to proceed to step S411 after the processing of step S408.

<Step S411>

The image generating unit 303 generates, as a transformation image, an image into which the image in the region for which the processing target feature point is made to be the center is transformed by the transformation matrix T. In this process, firstly the three-dimensional coordinates ($x_r$, $y_r$, $z_r$) are obtained by performing a perspective projection inverse transformation ($x_n$, $y_n$ and $z_n$ are reinterpreted as x, y and z respectively) using the foregoing Equations (1) through (3) using the image coordinates (x, y) of the processing target feature point and the depth value z of the processing target feature point, three-dimensional coordinates (xt, yt, zt) into which the three-dimensional coordinates (xr, yr, zr) are transformed using the transformation matrix T are obtained, and using the three-dimensional coordinates (xt, yt, zt) transformation into two-dimensional coordinates (x', y') on the target image corresponding to the three-dimensional coordinates (xt, yt, zt) is performed by performing a perspective projection transformation to the projection plane. This perspective projection transformation is performed in accordance with Equations (27) and (28) below.

$$x'_n = \frac{x_{tn} \cdot d}{z_{tn}} \tag{27}$$

$$y'_n = \frac{y_{tn} \cdot d}{z_{tn}} \tag{28}$$

Then, in the case where the position of the center pixel of the transformation image is made to be (x', y'), the pixel value at the processing target feature point at the target image is set to the pixel value at the position of the center pixel.

Then, for each pixel position pt other than (x', y') in the transformation image, a corresponding pixel position pq on the target image is obtained by performing an inverse transformation of the foregoing transformation in order to obtain (x', y') for the pixel position pt, and the pixel value of the pixel position pq in the target image is set as the pixel value at the pixel position pt. Additionally, in the case where the pixel position pq is a non-integer, a pixel value obtained by an interpolation such as a sum of squares from pixel values of pixels in the periphery thereof is set.

Figure 9A:
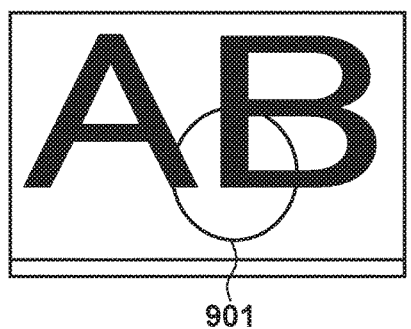
FIGS. 9A-9D are schematic diagrams of an example of a transformation of an image by a process in step S411.
Figure 9C:
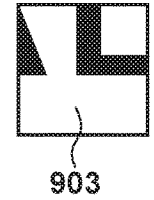
Figure 9B:
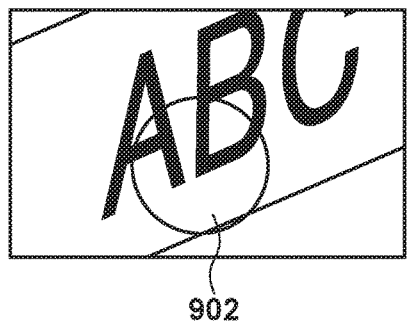

FIGS. 9A-9D are schematic diagrams of an example of a transformation of an image by the process of step S411. The image illustrated in FIG. 9A is something in which the target object is captured from the front, and there is no difference in the depth values in the three points. In such a case, the image of FIG. 9A itself is made to be the feature amount calculation image. An image 903 illustrated in FIG. 9C is a vicinity 901 of the processing target feature point, that is an image in the feature amount calculation region. The image illustrated in FIG. 9B is something that is captured in a state in which the target object is rotated by 60 degrees counter-clockwise with respect to the image capturing apparatus. In such a case, there is a difference in the depth values of the three points in a vicinity 902 of the processing target feature point, and therefore in the present embodiment, the image in the vicinity 902 is transformed so that these differences are reduced. What this is transformed into is an image 904 illustrated in FIG. 9D. In a case where an image that is transformed so that the depth values in the three points are reduced is generated, this generated image itself becomes the feature amount calculation region.

Figure 9D:
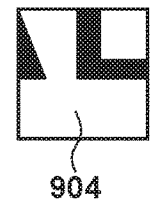

In this way, regardless of whether there is a difference in the depth values of the three points in the vicinity of the processing target feature points, the image that is the target of the extraction of the feature amount is similar as illustrated in FIGS. 9C and 9D.

<Step S412>

The calculation unit 304 sets the transformation image generated in step S411 to the feature amount calculation image.

<Step S413>

The calculation unit 304 sets the feature amount calculation region to the feature amount calculation image on the whole. Of course, the feature amount calculation region may be set to a portion of the feature amount calculation image. The range of this feature amount calculation region is the same range as in the feature amount calculation region conventionally.

<Step S414>

The calculation unit 304, from the image in the feature amount calculation region, calculates a feature amount (local feature amount) defined so as to be invariant even if there is a rotation of the image in the plane. As a method of calculating this local feature amount, Local Jet and a combination of derivatives thereof are employed in the present embodiment (refer to J. J. Koenderink and A. J. van Doorn, "Representation of local geometry in the visual system," Riological Cybernetics, vol. 55, pp. 367-375, 1987).

Specifically, the local feature amount V is calculated by the following Equation (29).

$$V = \begin{pmatrix} L \\ L_x L_x + L_y L_y \\ L_{xx} L_x L_x + 2 L_{xy} L_x L_y + L_{yy} L_y L_y \\ L_{xx} + L_{yy} \\ L_{xx} L_{xx} + 2 L_{xy} L_{xy} + L_{yy} L_{yy} \end{pmatrix} \tag{29}$$

where, the variables used in the right side of Equation (29) are defined in Equation (30) through Equation (35) as shown below. Here, G(x, y) on the right side of Equation (30) is a Gaussian function, I(x, y) is a pixel value at the image coordinates (x, y), and "*" is a symbol representing a convolution operation. Also, Equation (31) is a partial derivative with respect to x of the variable L defined in Equation (30), and Equation (32) is a partial derivative with respect to y of the variable L. Equation (33) is a partial derivative with respect to y of the variable Lx defined in Equation (31), Equation (34) is a partial derivative with respect to x of the variable Lx defined in Equation (31), and Equation (35) is a partial derivative with respect to y of Ly defined in Equation (32).

$$L = G(x, y) * I(x, y) \tag{30}$$

$$L_x = \frac{\partial L}{\partial x} \tag{31}$$

$$L_y = \frac{\partial L}{\partial y} \tag{32}$$

$$L_{xy} = \frac{\partial^2 L}{\partial x \partial y} \tag{33}$$

$$L_{xx} = \frac{\partial^2 L}{\partial x^2} \tag{34}$$

-continued $$L_{yy} = \frac{\partial^2 L}{\partial y^2} \quad (35)$$

Note that any feature amount calculation method can be applied if it is a method by which a local feature amount can be calculated, and limitation is not made to the feature amount calculation method as described above. For example, there is a SIFT feature amount, a SURF feature amount, and the like. For the SIFT feature amount, a predetermined range of a periphery of the local feature point is partitioned into 16 4×4 blocks, and for each of these blocks, a histogram of 8 gradient directions each differing by 45 degrees is generated, and a 128 dimension feature vector thereof is made to be the local feature amount.

Then, the calculation unit 304 outputs the obtained local feature amount to an appropriate output destination such as the storage unit 305.

<Step S415>

The image generating unit 303 determines whether or not all of the local feature point group extracted from the luminance-component image and the plurality of reduced images have been selected. If the result of this determination is that all have been selected, the processing in accordance with the flowchart of FIG. 4 completes, and in a case where an unselected local feature point still remains, the processing proceeds to step S416.

<Step S416>

The image generating unit 303 selects an unselected one of the local feature point group extracted from the luminance-component image and the plurality of reduced images as the processing target feature point. Then, the processing transitions to step S404.

In this way, by virtue of the present embodiment, it becomes possible to calculate a local feature amount that tends not to be influenced by an out-of-plane rotation.

[Second Embodiment]

In the present embodiment, explanation is given for an example of an image processing apparatus that that extracts a feature point (a local feature point) from an input image including an image region for which depth values of pixels change consecutively; sets, as a normalization transformation, a transformation that normalizes depth values of pixels in a vicinity of the feature point; identifies a pixel position into which the pixel position of the feature point is transformed by the normalization transformation; identifies as a feature amount calculation region a region on the input image transformed by the normalization transformation for a region surrounding the identified pixel position, and calculates a feature amount from the feature amount calculation region. In other words, whereas in the first embodiment the transformed image is generated by performing a transformation of the image so as to normalize the depth values of the three points in the vicinity of the processing target feature point, in the present embodiment the shape of the feature amount calculation region set for the processing target feature point is transformed so as to normalize the depth values at the three points in the vicinity of the processing target feature point without performing such a transformation of the image. Below, explanation is given predominantly for differences with the first embodiment, and to the extent that something is not touched upon particularly below, it is similar to in the first embodiment.

Figure 10:
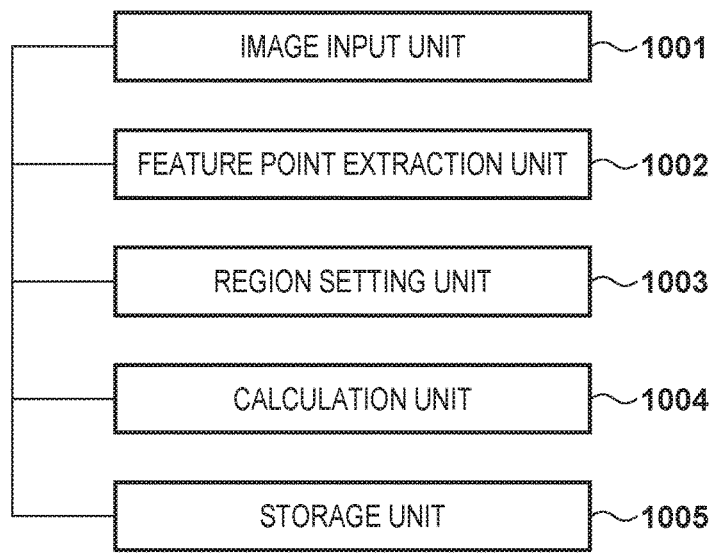
FIG. 10 is a block diagram for illustrating an example of a functional configuration of an image processing apparatus.

Firstly, explanation is given for an example of a functional configuration of the image processing apparatus according to the present embodiment using the block diagram of FIG. 10.

An image input unit 1001 inputs a source image. Note that explanation is given having information representing depth values of each pixel configuring a source image included in the source image.

A feature point extraction unit 1002, in addition to generating a luminance-component image representing the luminance component of the source image that the image input unit 1001 inputted, generates a plurality of reduced images by recursively reducing the luminance-component image a plurality of times, and extracts a local feature point from the luminance-component image and the plurality of reduced images respectively.

A region setting unit 1003 sets the feature amount calculation region for each local feature point that the feature point extraction unit 1002 extracts.

A calculation unit 1004, for each local feature point that the feature point extraction unit 1002 extracts, calculates a feature amount from the feature amount calculation region that the region setting unit 1003 sets, and outputs the calculated feature amount. The output destination of the feature amount is not limited to a particular output destination; output may be to a storage unit 1005, output may be to an external memory, and output may be to an external device that performs processing using that feature amount.

The storage unit 1005 is a memory that is used for the respective operations of the image input unit 1001, the feature point extraction unit 1002, the region setting unit 1003, and the calculation unit 1004, and, for example, the calculation unit 1004 stores a calculated feature amount in the storage unit 1005.

Figure 11:
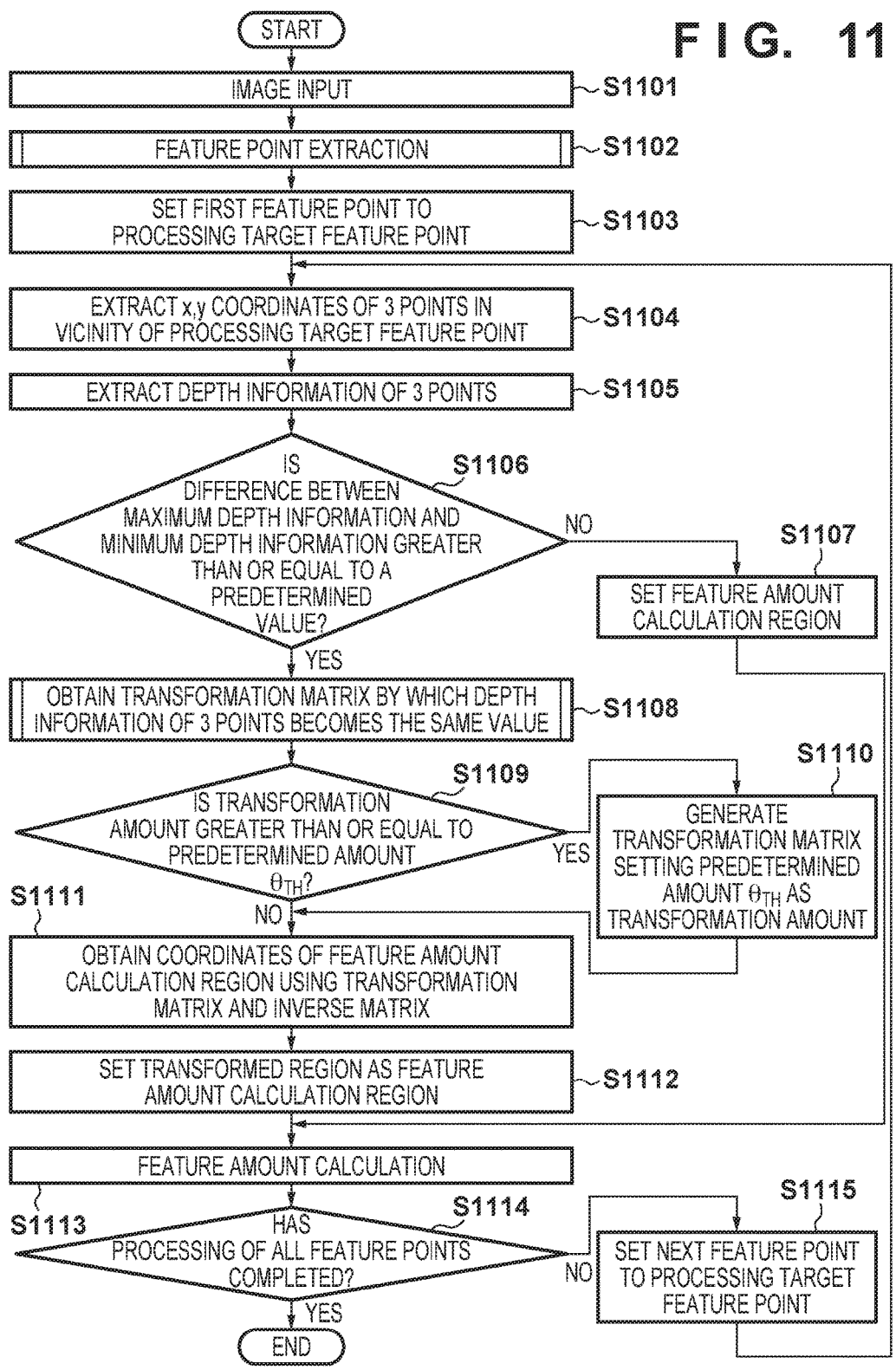
FIG. 11 is a flowchart of a process performed for calculating a feature amount from an image.

Next, explanation is given for a process that the image processing apparatus according to the present embodiment performs to calculate a feature amount from the image using FIG. 11 which illustrates a flowchart of the same process. Note that for the processing in each step of step S1101 through step S1106, step S1108 through step S1110, and step S1113 through step S1115, while the performer of the processing differs, the content of the processing is the same as in step S401 through step S406, step S408 through step S410, and step S414 through step S416 of FIG. 4 respectively, and therefore the explanation concerning these steps is omitted.

<Step S1107>

The region setting unit 1003 sets the feature amount calculation region to a vicinity of the processing target feature point. For a method of setting the feature amount calculation region in this case, a method that has been performed conventionally is employed.

<Step S1111>

Firstly, the region setting unit 1003 obtains the three-dimensional coordinates (xr, yr, zr) by performing a perspective projection inverse transformation ($x_n$, $y_n$ and $z_n$ are reinterpreted as x, y and z respectively) using the foregoing Equations (1) through (3) using the image coordinates (x, y) of the processing target feature point and the depth value z of the processing target feature point, obtains the three-dimensional coordinates (xt, yt, zt) into which the three-dimensional coordinates (xr, yr, zr) are transformed using the transformation matrix T, and using the three-dimensional coordinates (xt, yt, zt), transforms into two-dimensional coordinates (x', y') by performing a perspective projection transformation in accordance with Equations (27) and (28).

Next, the region setting unit 1003 sets a region surrounding the two-dimensional coordinates (x', y') (for example a region centered on the two-dimensional coordinates (x', y')). Hereinafter, in order to simplify the explanation, explanation is given having this set region be a rectangle, but if information defining the shape of the region is prepared, that shape may be any shape.

Next, the region setting unit 1003 performs an inverse transformation of the foregoing transformation in order to obtain the two-dimensional coordinates (x', y') with respect to the two-dimensional coordinates of the four corners of this set region.

<Step S1112>

The region setting unit 1003 sets as a feature amount calculation region a "region of a shape defined by the two-dimensional coordinates of the four corners obtained by performing the inverse transformation of the foregoing transformation in order to obtain the two-dimensional coordinates (x', y') with respect to the two-dimensional coordinates of the four corners of the set region" obtained in step S1111.

Figure 12A:
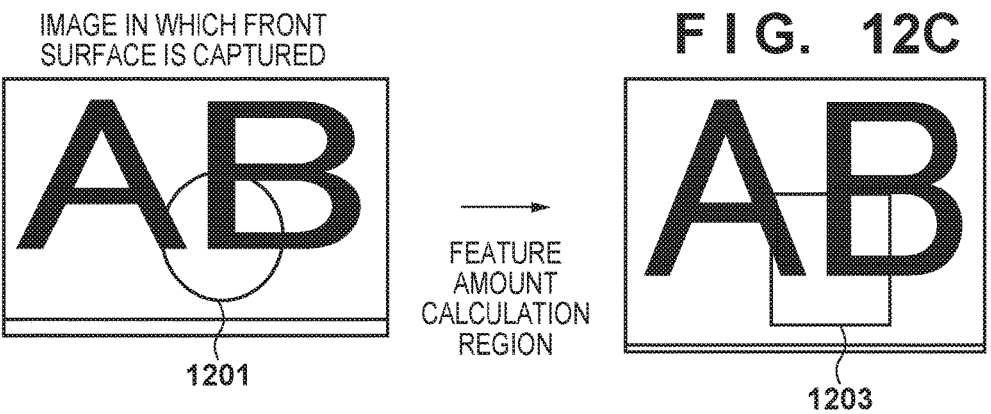
FIGS. 12A-12D are schematic diagrams of an example of setting of a feature amount calculation region according to a process in step S1111.
Figure 12B:
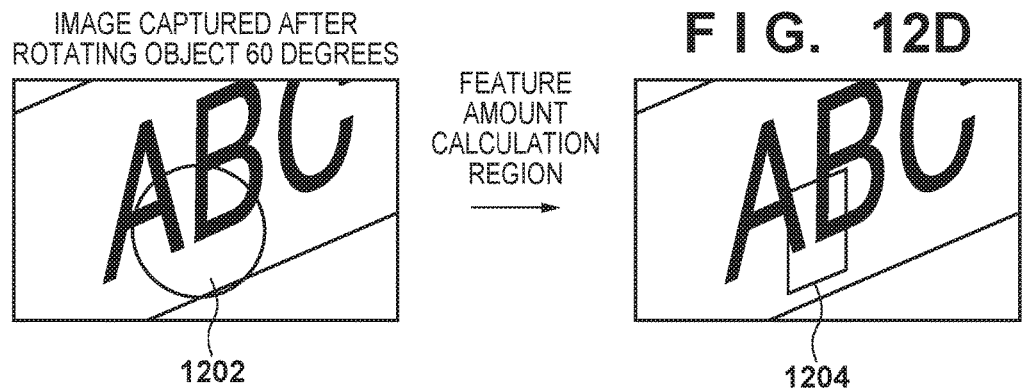
Figure 12C:
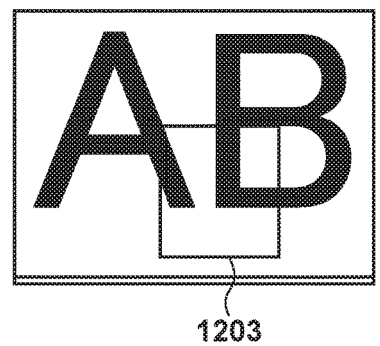
Figure 12D:
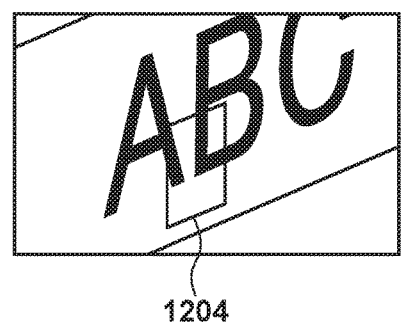

FIGS. 12A-12D are schematic diagrams of an example of setting a feature amount calculation region by the process of step S1111. The image illustrated in FIG. 12A is something in which the target object is captured from the front, and there is no difference in the depth values in the three points. Here, in such a case, if there is a processing target feature point in a region 1201 of FIG. 12A, a region 1203 is set as the feature amount calculation region as illustrated in FIG. 12C. The image illustrated in FIG. 12B is something that is captured in a state in which the target object is rotated by 60 degrees counterclockwise with respect to the image capturing apparatus. In such a case, there is a difference in the depth values of the three points in a vicinity 1202 of the processing target feature point, and therefore in the present embodiment, a feature amount calculation region 1204 of FIG. 12D is obtained so that these differences are reduced.

In this way, regardless of whether there is a difference in the depth values of the three points in the vicinity of the processing target feature points, the image within the feature amount calculation region is similar as illustrated in FIGS. 12C and D.

In this way, by virtue of the present embodiment, it becomes possible to calculate a local feature amount that tends not to be influenced by an out-of-plane rotation.

[Third Embodiment]

Whereas in the first embodiment, one transformation image is generated for one local feature point, in the present embodiment a region surrounding the local feature point is partitioned into a plurality of regions, and a transformation image is generated for each partitioned region. That is, for each local feature point, a transformation image is generated for each partitioned region corresponding to that local feature point. That is, whereas in the first embodiment one plane is identified and the transformation of the image is performed to normalize the depth values, in the present embodiment, a plurality of planes are identified and image transformation is performed to normalize the depth values. The present embodiment is effective in a case where there are a plurality of depth gradients in the local feature amount calculation region.

Below, explanation is given predominantly for differences with the first embodiment, and to the extent that something is not touched upon particularly below, it is similar to in the first embodiment. Also, in the present embodiment, an image processing apparatus having a similar configuration (FIG. 3) to that of the first embodiment is applied.

Figure 13A:
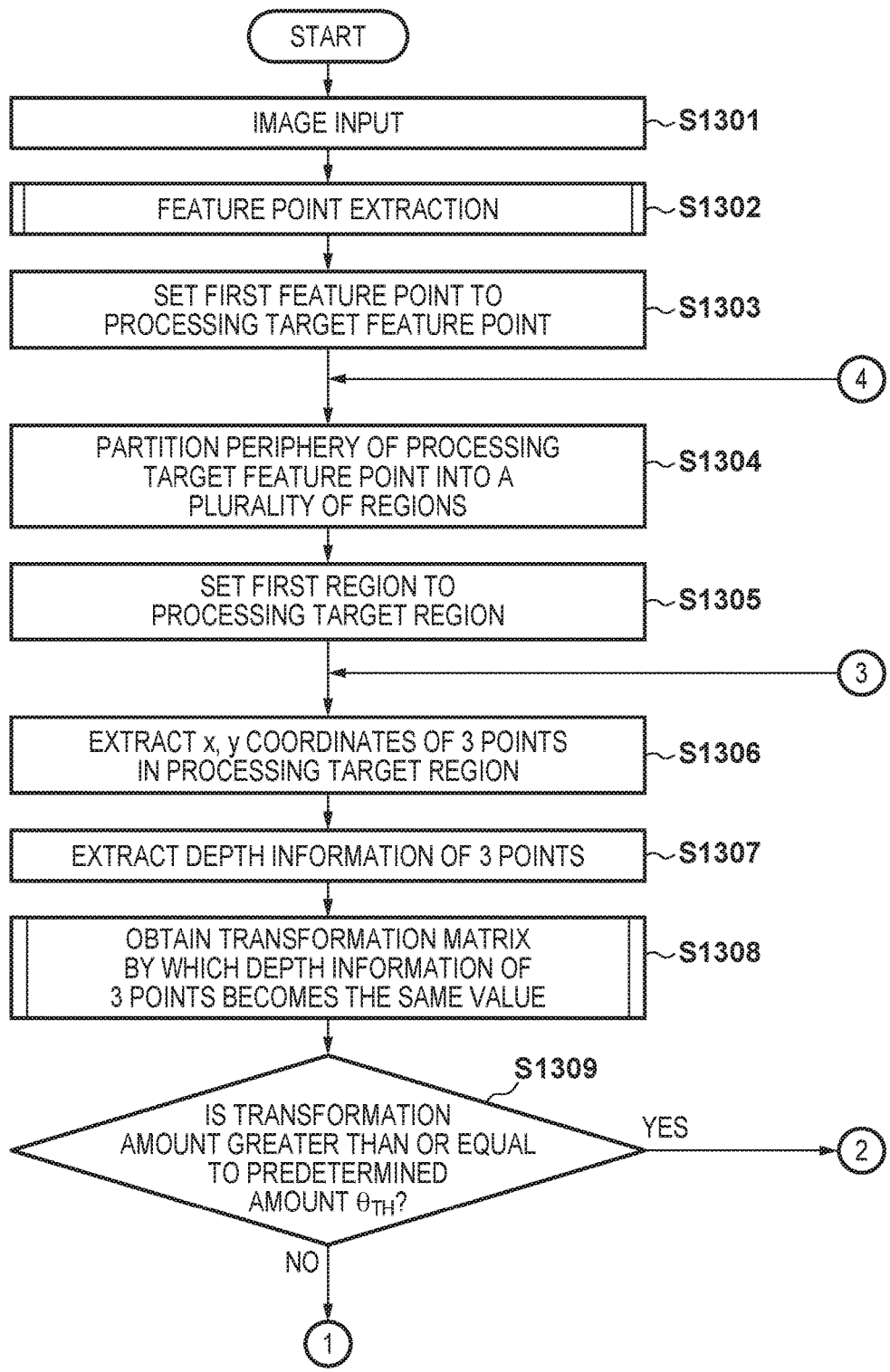
FIGS. 13A and 13B are flowcharts of a process performed to calculate a feature amount from an image.
Figure 13B:
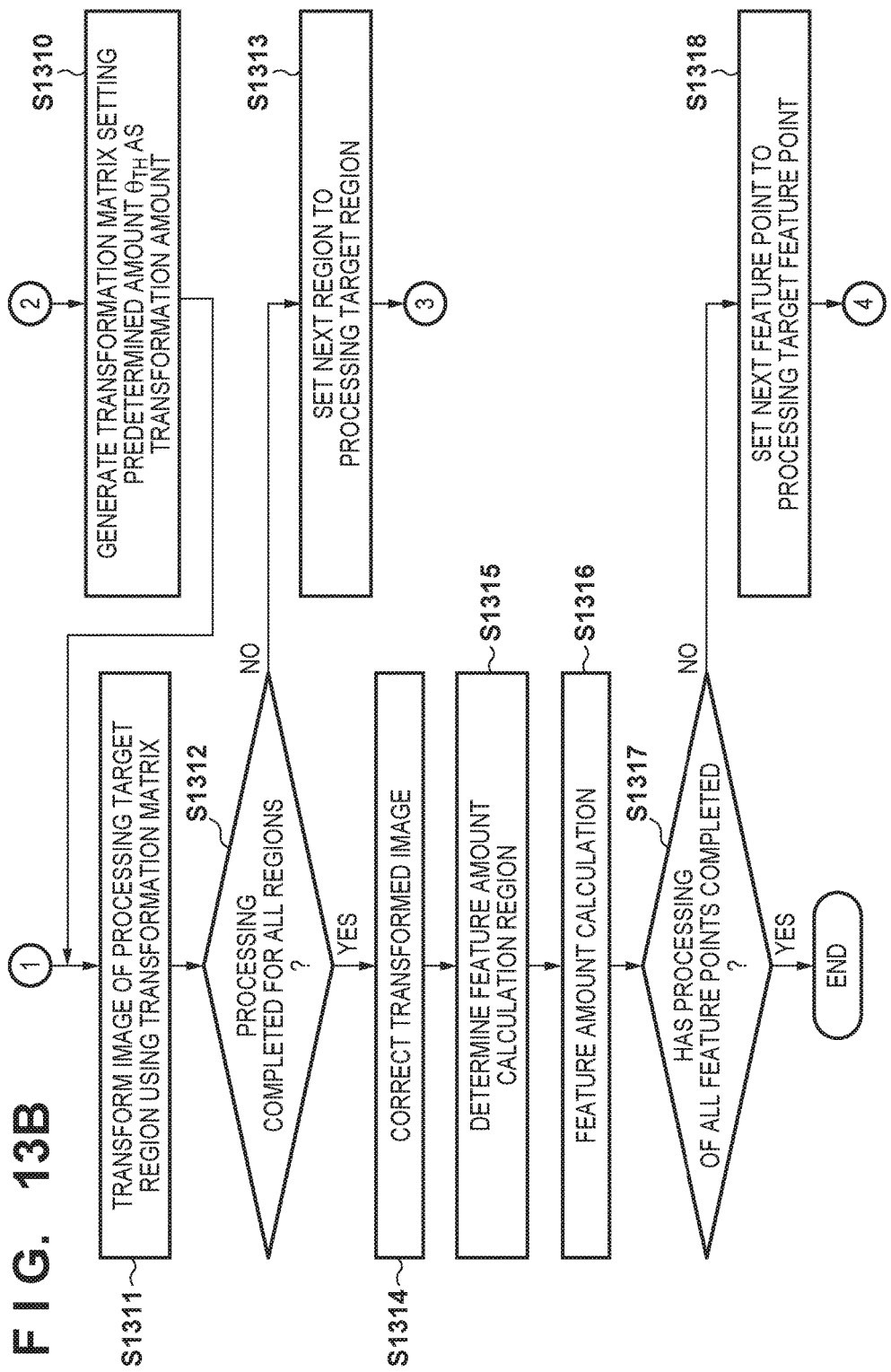

Next, explanation is given for a process that the image processing apparatus according to the present embodiment performs to calculate a feature amount from the image using FIGS. 13A and 13B each of which illustrates a flowchart of the same process. Note that for the processing in each step of step S1301 through step S1303, step S1308 through step S1310, and step S1315 through step S1318, while the performer of the processing differs, the content of the processing is the same as in step S401 through step S403, step S408 through step S410, and step S413 through step S416 of FIG. 4 respectively, and therefore the explanation concerning these steps is omitted.

<Step S1304>

The image generating unit 303 partitions a region surrounding the processing target feature point into a plurality of regions. For example, a region of a size twice that of the feature amount calculation region set in a technique that was conventional as the region surrounding the feature point is set as the region surrounding the processing target feature point, and that set region is divided into 4×4 blocks. Of course, the region size of the partition source, the number of partitions of the region, or the like are not limited to these examples. Also, the method of region partitioning is not limited to a rectangular mesh block partitioning, and partitioning in accordance with a polygon such as a triangle or a hexagon, or a method of partitioning by performing a segmentation, or the like, can be considered.

<Step S1305>

The image generating unit 303 selects as a processing target region an unselected partitioned region from the partitioned regions that are partitioned in step S1304.

<Step S1306>

The image generating unit 303 determines three points that do not line up on a straight line from the processing target region, and acquires the respective image coordinates of the determined three points.

<Step S1307>

The image generating unit 303 acquires a depth value at the pixels of the three points determined in step S1306.

<Step S1311>

The image generating unit 303 generates, as a transformation image, an image into which the image within the processing target region (within the partitioned region) is transformed by the transformation matrix T. Hereinafter, in order to simplify the explanation, explanation is given having the processing target region be a rectangle, but if information defining the shape of the processing target region is prepared, that shape may be any shape.

Firstly, the image generating unit 303 obtains the three-dimensional coordinates (xr, yr, zr) by performing a perspective projection inverse transformation ($x_n$, $y_n$ and $z_n$ are reinterpreted as x, y and z respectively) using the foregoing Equations (1) through (3) using the image coordinates (x, y) of the four corners of the processing target region and the depth value z of the four corners, obtains the three-dimensional coordinates (xt, yt, zt) into which the three-dimensional coordinates (xr, yr, zr) are transformed using the transformation matrix T, and using the three-dimensional coordinates (xt, yt, zt), transforms into two-dimensional coordinates (x', y') by performing a perspective projection transformation in accordance with Equations (27) and (28). Then, the image generating unit 303, for each pixel pt in the region surrounded by the transformed two-dimensional coordinates of the four corners, obtains the corresponding pixel position pq on the target image by performing an inverse transformation of the foregoing transformation to obtain (x', y') for the pixel position pt, and sets the pixel value of the pixel position pq in the target image as the pixel value at the pixel position pt. Additionally, in the case where the pixel position pq is a non-integer, a pixel value obtained by an interpolation such as a sum of squares from pixel values of pixels in the periphery thereof is set.

<Step S1312>

The image generating unit 303 determines whether or not all of the partitioned regions partitioned in step S1304 are selected in step S1305. If the result of this determination is that all partitioned regions have been selected in step S1305, the processing proceeds to step S1314, and if a partitioned region that is still unselected remains, the processing proceeds to step S1313.

<Step S1313>

The image generating unit 303 selects as a processing target region an unselected partitioned region from the partitioned regions that are partitioned in step S1304. Then, the processing transitions to step S1306.

<Step S1314>

The image generating unit 303 performs a correction of the transformation image generated for each partitioned region. Due to partitioning into regions and then performing the processing, there are cases in which there are gaps between the regions, and in which the regions overlap, and therefore these are corrected. A rule such as to use a transformation matrix for a region closest to the processing target feature point in a case where such regions exist is established and applied.

In this way, by virtue of the present embodiment, it becomes possible to calculate a local feature amount that tends not to be influenced by an out-of-plane rotation from a captured image of an object that is not a simple plane.

[Fourth Embodiment]

In the present embodiment, an image search is performed using a feature amount calculated using the feature amount calculation technique in accordance with one of the embodiments of the first through third embodiments, and the results of the search are displayed lined up in order of similarity. Firstly, explanation is given for an example of a functional configuration of the image processing apparatus according to the present embodiment using the block diagram of FIG. 14.

An image input unit 1401, a feature point extraction unit 1402, an image generating unit 1403 and a calculation unit 1404 are the same as the image input unit 301, the feature point extraction unit 302, the image generating unit 303 and the calculation unit 304 illustrated in FIG. 3, and therefore an explanation for these functional units is omitted. A basic function of a storage unit 1409 is the same as that of the storage unit 305, but in the storage unit 1409, a feature amount calculated using the feature amount calculation technique in accordance with one embodiment of the first through third embodiments, and information specific to an image that is the acquisition source of that feature amount are additionally associated and registered for a comparison target image in advance.

A quantization unit 1405 quantizes each local feature amount calculated by the calculation unit 1404.

A registration unit 1406 associates a local feature amount quantized from the quantization unit 1405 and information specific to the image which is the calculation source of the local feature amount, and registers them to the storage unit 1409.

A searching unit 1407 searches the storage unit 1409 for information specific to a comparison target image that is similar to a comparison source image input as a query image.

A display unit 1408 causes a display apparatus such as a CRT, a liquid crystal screen, or the like to display the results of a search by the searching unit 1407.

Figure 15:
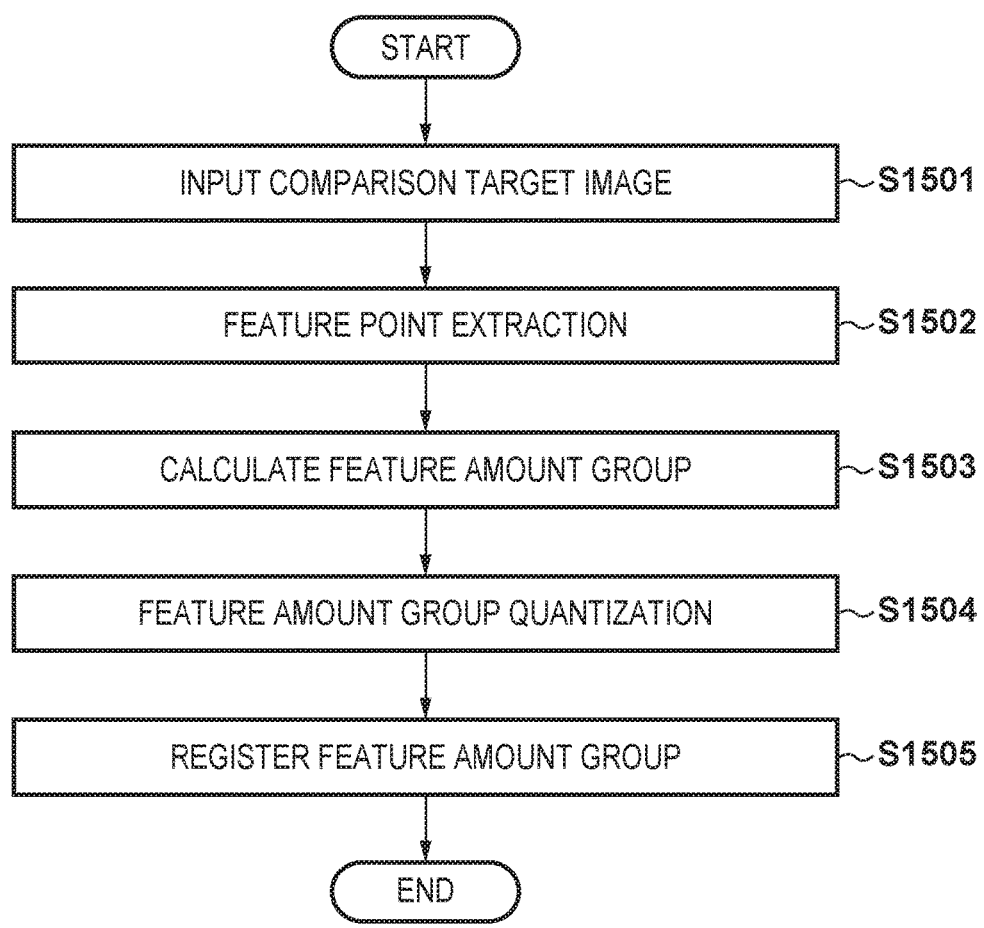
FIG. 15 is a flowchart of processing for registering a local feature amount calculated from information specific to an image and that image.

Next, explanation is given for processing that the image processing apparatus performs in order to associate and register to the storage unit 1409 information specific to various images (comparison target images) and respective local feature amounts calculated from the images using FIG. 15 which illustrates a flowchart of the same processing.

Note that the processing in each step of step S1501 and step S1502 is similar to that of step S401 and step S402 respectively, and therefore an explanation concerning these steps is omitted. Also, by executing, in step S1503, one of the feature amount calculation processing according to the first embodiment (the processing of step S403 through step S416), the feature amount calculation processing according to the second embodiment (step S1103 through step S1115), and the feature amount calculation processing according to the third embodiment (step S1303 through step S1318), a local feature amount (vector) for each local feature point extracted from the comparison target image is calculated.

<Step S1504>

The quantization unit 1405 quantizes each local feature amount calculated in step S1503. The local feature amount obtained here, that is the local feature amount calculated from each local feature point by Local Jet or a combination of derivatives thereof, is a vector of N dimensions. Here, quantization is performed in Kn gradations for a feature amount of an n-th ($1 \leq n \leq N$) dimension from the N dimensions. Here, N and Kn are assumed to be determined in advance.

Specifically, by Equation (36) below, quantization is performed.

$$Qn=(Vn*Kn)/(Vn\_max-Vn\_min+1) \quad (36)$$

Qn is a value into which a feature amount Vn, which is of the n-th dimension from the N dimensions, is quantized. Vn_max and Vn_min are respectively the minimum value and maximum value of values that the n-th dimension feature amount can take.

By collecting the quantized values of each dimension, it is possible to obtain a quantized local feature amount, and by collecting all of the quantized local feature amount of the target image it is possible to obtain a quantized local feature amount group.

Note that in the foregoing quantization, a number of quantized gradations is established for each dimension, but a common number of gradations may be configured for all dimensions or for several dimensions. This method of quantization is a method of partitioning the feature amount space into a reticular pattern as illustrated in FIG. 16A, but a method of partitioning into a lattice shape as in FIG. 16B may also be employed. A grid 1601 of FIG. 16A and a point 1602 represent a quantization region in the feature amount space and a feature respectively. A feature is associated with a quantization region. FIGS. 16A and B are both examples in which for convenience the two-dimensional feature amount space is quantization-partitioned. Because the local feature amount is multi-dimensional (for example, 128 dimensional), actually partitioning is performed in a multi-dimensional feature amount space.

Also, limitation is not made to the method for quantizing based on the above-described rule, and any the partition method can be applied if a method can partition the feature amount space. For example, configuration may be taken so as to generate clustering rules by causing machine learning of a plurality of images, and quantizing by partitioning a feature amount space conforming to those rules.

Also, after performing quantizing for each dimension, it is possible to handle in a substantially equivalent manner to a first dimension feature amount by performing labeling of quantized value groups by Equation (37) below.

$$IDX = Q_1 + Q_2 * K_1 + Q_3 * K_1 * K_2 + \ldots + Q_n * K_1 * K_2 * \ldots * K_{n-1} \quad (37)$$

Also, in a case where the number of gradations is common for all dimensions, labeling of quantized value groups is possible by Equation (38) below. Here, K is the number of gradations.

$$IDX = \sum_{n=1}^{N} K^{(n-1)} Q n \quad (38)$$

Note that limitation is not made to the method of calculating described above, and any method for labeling can be applied if it is a method of calculating that is capable of labeling.

<Step S1505>

The registration unit 1406 in addition to registering to the storage unit 1409 each local feature amount obtained in step S1504 as a feature amount ID, associates the image ID issued uniquely to the image that is the calculation source of the local feature amount with that feature amount ID, and registers them. That is, in the storage unit 1409, for each local feature amount, a corresponding feature amount ID and the image ID of the image that is the calculation source for that local feature amount are registered in association.

Figures 17, 18:
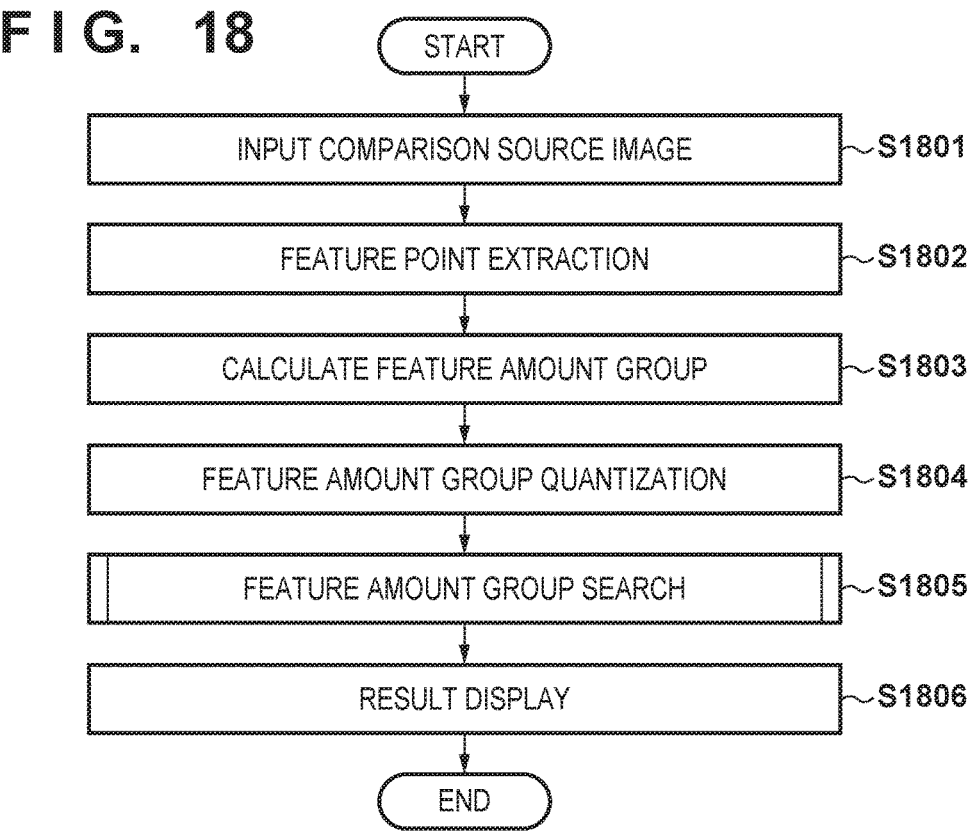
FIG. 17 is a view for showing an example of managing feature amount IDs and image IDs in a storage unit 1409.
FIG. 18 is a flowchart of an image search process.

An example of managing feature amount IDs and image IDs in the storage unit 1409 is illustrated in FIG. 17. Additionally, in a case of registering a feature amount ID for the same image, and a case of registering a feature amount ID for similar images, a plurality of image IDs are associated with one feature amount ID. Also, there are cases in which a feature amount ID that is not used exists.

Next, explanation is given for processing that the image processing apparatus performs in order to display a list by searching image IDs of a comparison source image input as a query image and similar comparison target images, using FIG. 18 which illustrates a flowchart for the same processing.

Because processing in each step of step S1801, step S1802, step S1803, and step S1804 is respectively similar to that of step S401, step S402, step S1503, and step S1504, explanation concerning these steps is omitted. Note that in step S1803, the same feature amount calculation technique as the feature amount calculation technique employed in step S1503 is used.

<Step S1805>

The searching unit 1407 searches the storage unit 1409 for an image ID of a similar image based on the quantized local feature amount calculated from the comparison source image. For details of the process in step S1805, explanation is given using a flowchart of FIG. 19.

<Step S1901>

The searching unit 1407 allocates memory regions corresponding to respective image IDs (a memory region used as a voting box) in the storage unit 1409. For example, a voting box 1 corresponding to image ID=1, a voting box 2 corresponding to image ID=2, . . . , and a voting box N corresponding to image ID=N are allocated in the storage unit 1409.

<Step S1902>

The searching unit 1407 initializes a variable c, which is arranged for each voting box, and that indicates the number of votes for the voting box to 0.

<Step S1903>

The searching unit 1407 sets the value of the variable k by 1.

<Step S1904>

The searching unit 1407 acquires the k-th feature amount ID from feature amount IDs representing local feature amounts already quantized that are calculated from the comparison source image.

<Step S1905>

The searching unit 1407 identifies something that is the same or something that is similar to the feature amount ID acquired in step S1904 from the feature amount IDs registered in the storage unit 1409, and identifies the image ID registered in association with that identified feature amount ID. Note that in a case where multiple image IDs are registered in association with something that is the same or something that is similar to the feature amount ID acquired in step S1904, those multiple image IDs are identified. There are cases in which one or more image IDs identified in this step are referred to as a reference image ID list.

<Step S1906>

The searching unit 1407 increments the value of the variable C corresponding to the voting boxes corresponding to the image IDs identified in step S1905 by 1. Note that the number of the incrementation is not limited to 1. For example, configuration may be taken to increment by a number corresponding to a level of similarity of the feature amount ID (the higher the level of similarity of the feature amount ID, the larger the number), and configuration may be taken to increment by a number based on the coordinates of the local feature point.

<Step S1907>

The searching unit 1407 increments the value of the variable k by 1.

<Step S1908>

The searching unit 1407 determines whether or not the value of the variable k is less than or equal to a number of local feature points extracted from the comparison source image. If the result of the determination is that the value of the variable k is less than or equal to the number of local feature points extracted from the comparison source image, the processing returns to step S1904, and if the value of the variable k exceeds the number of local feature points extracted from the comparison source image, the processing proceeds to step S1909.

<Step S1909>

The searching unit 1407 sorts the image IDs in order from the largest number of votes (the value of the variable C).

Note that there are cases in which when the local feature amount are quantized, the quantized values differ even though the local feature amounts are similar; in such cases the feature amount IDs are different. As a counter-measure to this, in addition to those whose feature amount ID is the same as what is acquired in step S1904, feature amount IDs that are similar to the feature amount ID acquired in step S1904 are identified in step S1905, and image IDs corresponding to feature amount IDs that are the same as the feature amount ID acquired in step S1904 and feature amount IDs that are similar to the feature amount ID acquired in step S1904 are identified respectively.

<Step S1806>

The display unit 1408 displays the image IDs sorted in step S1909 to a display apparatus configured by a CRT, a liquid crystal screen, or the like. Note that the display target is not limited to image IDs, and images corresponding to the image IDs, or attribute information of those images (a file name, a creation date/time, a file size, or the like) may be combined in the display.

In this way, by virtue of the present embodiment, an image search is made possible even in a case where an object that is subject to an out-of-plane rotation is captured. Note that in the present embodiment, an image search process that accords with a voting method is employed, but configuration may be taken to perform an image search process by another method.

[Fifth Embodiment]

In the first through fourth embodiments, a method of transforming, in which 1 or more planes are identified using depth values of the periphery of the local feature point, and the depth values are normalized, is established. However, configuration may be taken so as estimate a curved surface by a Hough transform rather than identifying a plane. In such a case, a method of normalizing the depth values by transforming that curved surface into an expanded image can be considered. The transformation to the expanded image is a well known technique, and can be realized by using a conventional method such as is recited in Japanese Patent Laid-Open No. 2000-57377, for example.

[Sixth Embodiment]

Figure 14:
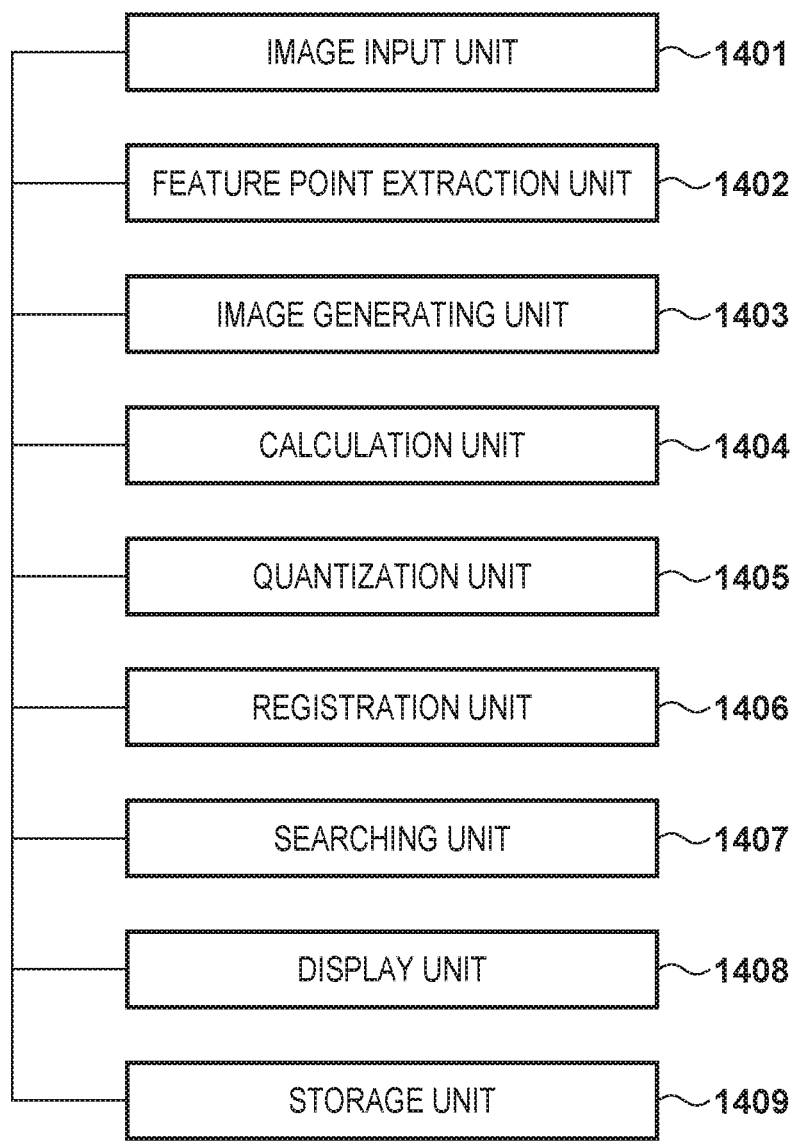
FIG. 14 is a block diagram for illustrating an example of a functional configuration of an image processing apparatus.

Each functional unit illustrated in FIGS. 3, 10, and 14 may be configured by hardware completely, but a portion may be configured by software. In the case of the latter, for example in the case of computer apparatus having a memory apparatus (a hard disk, a RAM, a ROM, or the like) that functions as the storage units 305, 1005, and 1409, and also has a processor that can execute a computer program that can realize functions of each functional unit other than the storage units 305, 1005, and 1409, it may be applied to the image processing apparatus in accordance with each aforementioned embodiment. A hardware configuration example of such a computer apparatus is explained using the block diagram of FIG. 2.

By using data or a computer program stored in a ROM 202 or a RAM 203 to execute processing, a CPU 201 performs operation control of a computer apparatus 200 on the whole, and also executes each of the above described processes as something that an image processing apparatus that applies the computer apparatus 200 performs.

Configuration data, a boot program, or the like of the computer apparatus 200 are stored in the ROM 202. The ROM 202 also handles a portion of functions of the storage units 305, 1005, and 1409.

The RAM 203 has an area for storing a computer program or data loaded from an external storage apparatus 204, data received from an external unit via a communication interface 207, or the like. In addition, the RAM 203 has a work area that is used when the CPU 201 executes various processing. With such a configuration, the RAM 203 can appropriately provide various areas. The RAM 203 also handles a portion of functions of the storage units 305, 1005, and 1409.

The external storage apparatus 204 is a large capacity information storage device as typified by a hard disk drive device. The external storage apparatus 204 stores an OS (operating system), or a computer program or data for causing the CPU 201 to execute each above-described process as something that the image processing apparatus performs. The computer program includes a computer program for causing the CPU 201 to execute each above-described process as something that each functional unit other than the storage units 305, 1005, and 1409 in FIGS. 3, 10, 14 performs. In addition, this data includes that which was explained in the above-described processing as known information, or data described above as that which the storage units 305, 1005, and 1409 hold. The computer program and data stored in the external storage apparatus 204 are appropriately loaded into the RAM 203 in accordance with control by the CPU 201, and become a target of processing by the CPU 201.

Note that the external storage apparatus 204 may employ a floppy disk (FD), an optical disk such as a Compact Disc (CD), magnetic or optical card, an IC card, a memory card, or the like, which can be attached/detached from the computer apparatus 200.

Also, the external storage apparatus 204 handles a portion of functions of the storage units 305, 1005, and 1409.

An input device 209 is configured by a user interface such as a keyboard or a mouse, and can input various instructions to the CPU 201 by a user operating it. The input device 209 is connected to an input device interface 205.

A monitor 210 is configured by a CRT, a liquid crystal screen, or the like, and can display a result of processing by the CPU 201 by using an image, text, or the like. The monitor 210 is connected to an output device interface 206.

A network line 211 includes a LAN, the Internet, or the like, and may be a wired line, may be a wireless line, or may be a combination thereof.

The communication interface 207 performs transmission and reception of data via the network line 211. In addition, devices such as a digital camera 212, a digital video camera 213, a smart phone 214, or the like can be connected to the communication interface 207, and it performs data communication with these devices. For example, an image (a still image, or each frame of a moving image) captured by the digital camera 212, the digital video camera 213, the smart phone 214, or the like may be transferred to the external storage apparatus 204 or the RAM 203 via the communication interface 207, and used as a target for calculating a feature amount.

The CPU 201, the ROM 202, the RAM 203, the external storage apparatus 204, the input device interface 205, the output device interface 206, and the communication interface 207 are all connected to a system bus 208.

Note that in order to realize the image processing apparatus according to the first through fifth embodiments, a single instance of the computer apparatus 200 that has the configuration of FIG. 2 may be used, or a plurality of computer apparatuses having a similar configuration may be used. In the case of configuring the image processing apparatus in accordance with the first through fifth embodiments by a plurality of computer apparatuses, these are connected to each other communicably by a Local Area Network (LAN). The computer apparatuses can be realized by information processing apparatuses such as a personal computer (PC), a work station (WS) or the like.

Also, configuration may be taken to realize the functions of each functional unit other than the storage units 305, 1005, and 1409 by the CPU 201, and configuration may be taken such that control circuits such as an ASIC that operates in cooperation with the CPU 201 realize the functions of the functional units other than the storage units 305, 1005, and 1409. Also, configuration may be taken to realize the functions of the functional units other than the storage units 305, 1005, and 1409 by cooperation between a CPU and a control circuit that controls an operation of the image processing apparatus. Also, the CPU need not be a single instance; there may be a plurality thereof. In this case, processing can be executed by distributing among the plurality of CPUs. Also, the plurality of CPUs may be laid out in a single computer apparatus, or may be laid out in a plurality of physically different computer apparatus.

The image processing apparatus according to the first through fifth embodiments may be implemented as a device that is embedded in an image capturing apparatus such as a digital camera. Here, the image capturing apparatus, using a method explained in the first through fifth embodiments, can calculate the local feature amounts of the image that it captured itself, and it can perform the image search according to the fourth embodiment using such local feature amounts.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-060016, filed Mar. 23, 2015, which is hereby incorporated by reference herein in its entirety.

What is claimed is:

1. An image processing apparatus, comprising:
one or more processors; and
one or more memories storing instructions that, when executed by the one or more processors, cause the image processing apparatus to perform operations comprising:
extracting a feature point from an input image including an image region which includes pixels having different depth values;
determining a transformation matrix to normalize depth values of pixels of a vicinity of the feature point in the input image to be the same value;
generating, in accordance with the determined transformation matrix, an image by transforming pixel positions of the vicinity of the feature point; and
calculating a feature amount from a region of the vicinity of the feature point in the generated image,
wherein the determining determines, as the transformation matrix, a matrix that causes a normal vector of a plane including three-dimensional coordinates of the pixels in the vicinity of the feature point which are represented by coordinates of the pixels of the vicinity of the feature point and depth values of the pixels to be parallel with a depth direction of the input image.

2. The image processing apparatus according to claim 1, wherein the generating generates the image if a difference between a maximum depth value and a minimum depth value among the depth values of the pixels of the vicinity of the feature point is greater than or equal to a predetermined value.

3. The image processing apparatus according to claim 2, wherein
if the difference is smaller than the predetermined value, the calculating calculates the feature amount from a region of the vicinity of the feature point in the input image without generating the image.

4. The image processing apparatus according to claim 1, wherein the generating generates the image by transforming the entirety of the input image.

5. The image processing apparatus according to claim 1, wherein the instructions, when executed by the one or more processors, cause the image processing apparatus to perform further operations comprising:
partitioning an image region including the feature point into a plurality of partitioned regions, wherein
the generating generates the image by transforming pixel positions of at least one of the partitioned regions, and
the calculating calculates a feature amount from the generated image.

6. The image processing apparatus according to claim 1, wherein the instructions, when executed by the one or more processors, cause the image processing apparatus to perform further operations comprising:
associating and registering, in a memory, the calculated feature amount and information unique to an image that is an acquisition source of the feature amount.

7. The image processing apparatus according to claim 6, wherein the instructions, when executed by the one or more processors, cause the image processing apparatus to perform further operations comprising:
searching for information registered in the memory in association with feature amounts that are respectively the same as or similar to feature amounts that the calculating calculates for a comparison source image; and
displaying, based on the searched information, information unique to an image whose feature amount is similar to a feature amount of the comparison source image.

8. An image processing method that an image processing apparatus performs, the method comprising:
extracting a feature point from an input image including an image region which includes pixels having different depth values;
determining a transformation matrix to normalize depth values of pixels of a vicinity of the feature point in the input image to be the same value;

generating, in accordance with the determined transformation matrix, an image by transforming pixel positions of the vicinity of the feature point; and calculating a feature amount from a region of the vicinity of the feature point in the generated image, wherein the determining determines, as the transformation matrix, a matrix that causes a normal vector of a plane including three-dimensional coordinates of the pixels in the vicinity of the feature point which are represented by coordinates of the pixels of the vicinity of the feature point and depth values of the pixels to be parallel with a depth direction of the input image.

9. A non-transitory computer-readable storage medium storing instructions that, when executed by one or more processors, cause a computer to:

extract a feature point from an input image including an image region which includes pixels having different depth values;

determine a transformation matrix to normalize depth values of pixels of a vicinity of the feature point in the input image to be the same value;

generate, in accordance with the determined transformation matrix, an image by transforming pixel positions of the vicinity of the feature point; and calculate a feature amount from a region of the vicinity of the feature point in the generated image, wherein the determining determines, as the transformation matrix, a matrix that causes a normal vector of a plane including three-dimensional coordinates of the pixels in the vicinity of the feature point which are represented by coordinates of the pixels of the vicinity of the feature point and depth values of the pixels to be parallel with a depth direction of the input image.

* * * * *